(12) United States Patent
Fujii et al.

(10) Patent No.: US 8,131,859 B2
(45) Date of Patent: Mar. 6, 2012

(54) WIRELESS COMMUNICATION SYSTEM, AND WIRELESS COMMUNICATION DEVICE AND CONTROL METHOD

(75) Inventors: Ken'ichi Fujii, Katsushika-ku (JP); Mitsuhiro Watanabe, Ebina (JP); Masanori Nakahara, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 753 days.

(21) Appl. No.: 10/551,173

(22) PCT Filed: Apr. 20, 2004

(86) PCT No.: PCT/JP2004/005600
§ 371 (c)(1),
(2), (4) Date: Sep. 29, 2005

(87) PCT Pub. No.: WO2004/098128
PCT Pub. Date: Nov. 11, 2004

(65) Prior Publication Data
US 2006/0206592 A1    Sep. 14, 2006

(30) Foreign Application Priority Data
Apr. 23, 2003 (JP) .................... 2003-118834

(51) Int. Cl.
*G06F 15/16* (2006.01)

(52) U.S. Cl. .................... 709/228; 370/310; 709/227

(58) Field of Classification Search .......... 709/227–228; 370/310
See application file for complete search history.

(56) References Cited

U.S. PATENT DOCUMENTS

| | | | |
|---|---|---|---|
| 4,905,234 A | 2/1990 | Childress et al. | 370/94.1 |
| 5,261,117 A | 11/1993 | Olson | 455/34.1 |
| 5,687,320 A | 11/1997 | Wiley et al. | 709/245 |
| 5,699,495 A | 12/1997 | Snipp | 395/114 |
| 5,818,603 A | 10/1998 | Motoyama | |
| 5,937,148 A | 8/1999 | Okazawa | 358/1.13 |
| 6,000,864 A | 12/1999 | Hanada | |
| 6,065,123 A | 5/2000 | Chou et al. | 713/322 |

(Continued)

FOREIGN PATENT DOCUMENTS

EP    1 022 876 A1    7/2000

(Continued)

OTHER PUBLICATIONS

The Cable Guy. "The Windows XP Wireless Zero Configuration Service", Microsoft TechNet, Nov. 2002, 5 pages.*

(Continued)

*Primary Examiner* — George Neurauter
(74) *Attorney, Agent, or Firm* — Fitzpatrick, Cella, Harper & Scinto

(57) ABSTRACT

This invention has as its object to establish a wireless communication between wireless communication devices and to provide a desired service without any troublesome setup operations. To this end, a digital camera and printer of this invention have wireless communication functions. When it is determined that a wireless communication instruction is issued by a console of the digital camera, a beacon from a network is detected. Upon detection of the beacon, search request information used to confirm the presence of a wireless communication processing device on a network identified by network identification information included in the beacon is transmitted in accordance with that network identification information. If response information to this transmitted request information is detected, identification information of a partner wireless communication device included in the response information is stored, and is displayed to allow the user to select a connection target device.

8 Claims, 22 Drawing Sheets

U.S. PATENT DOCUMENTS

| | | |
|---|---|---|
| 6,091,515 A | 7/2000 | Kimura .................... 358/434 |
| 6,104,886 A | 8/2000 | Suzuki et al. |
| 6,115,137 A | 9/2000 | Ozawa et al. ................. 358/1.6 |
| 6,148,198 A | 11/2000 | Anderson et al. ............. 455/432 |
| 6,157,465 A | 12/2000 | Suda et al. .................... 358/407 |
| 6,163,816 A | 12/2000 | Anderson et al. ................ 710/8 |
| 6,308,227 B1 | 10/2001 | Kumar et al. .................... 710/4 |
| 6,353,599 B1* | 3/2002 | Bi et al. ......................... 370/328 |
| 6,445,412 B1 | 9/2002 | Shiohara ................. 348/333.05 |
| 6,446,108 B1 | 9/2002 | Rosenberg et al. ........... 709/203 |
| 6,477,570 B1 | 11/2002 | Takayama et al. ............ 709/224 |
| 6,493,104 B1 | 12/2002 | Cromer et al. ............... 358/1.15 |
| 6,522,881 B1* | 2/2003 | Feder et al. ................... 455/437 |
| 6,529,522 B1* | 3/2003 | Ito et al. ........................ 370/466 |
| 6,552,743 B1 | 4/2003 | Rissman |
| 6,553,431 B1 | 4/2003 | Yamamoto et al. .............. 710/8 |
| 6,577,338 B1 | 6/2003 | Tanaka et al. |
| 6,584,311 B1 | 6/2003 | Sorenson et al. ............. 455/432 |
| 6,603,506 B2 | 8/2003 | Ogawa et al. .............. 348/207.2 |
| 6,618,553 B1 | 9/2003 | Shiohara |
| 6,631,008 B2 | 10/2003 | Aoki ............................ 358/1.15 |
| 6,633,757 B1 | 10/2003 | Hermann et al. ............. 455/414 |
| 6,650,795 B1 | 11/2003 | Motta ........................... 382/312 |
| 6,665,712 B2* | 12/2003 | Pickup ......................... 709/219 |
| 6,693,665 B1 | 2/2004 | Shindo et al. |
| 6,771,896 B2 | 8/2004 | Tamura ........................... 396/57 |
| 6,778,827 B1 | 8/2004 | Anderson et al. ............. 455/434 |
| 6,782,260 B2 | 8/2004 | Nakakita et al. ............ 455/435.1 |
| 6,813,037 B1 | 11/2004 | Collard ........................ 358/1.15 |
| 6,816,067 B2* | 11/2004 | Patton .......................... 340/505 |
| 6,820,126 B2* | 11/2004 | Sibecas et al. ................ 709/229 |
| 6,823,198 B2* | 11/2004 | Kobayashi ................ 455/556.1 |
| 6,839,757 B1 | 1/2005 | Romano et al. ............... 709/226 |
| 6,862,594 B1 | 3/2005 | Saulpaugh et al. ............. 707/10 |
| 6,867,882 B1 | 3/2005 | Takahashi |
| 6,876,382 B1 | 4/2005 | Sakamoto |
| 6,920,506 B2 | 7/2005 | Barnard et al. ............... 709/245 |
| 7,038,714 B1 | 5/2006 | Parulski et al. ............. 348/207.2 |
| 7,042,496 B2 | 5/2006 | Sato ............................ 348/207.2 |
| 7,062,579 B2 | 6/2006 | Tateyama et al. |
| 7,072,053 B2 | 7/2006 | Guddanti ..................... 358/1.13 |
| 7,072,056 B1 | 7/2006 | Greaves et al. |
| 7,088,691 B2 | 8/2006 | Fujita ........................... 370/311 |
| 7,102,640 B1* | 9/2006 | Aholainen et al. ............ 345/440 |
| 7,103,313 B2* | 9/2006 | Heinonen et al. ............ 455/41.2 |
| 7,103,357 B2 | 9/2006 | Kirani et al. ............... 455/426.1 |
| 7,106,357 B2* | 9/2006 | Fukuda et al. .............. 348/14.02 |
| 7,120,129 B2* | 10/2006 | Ayyagari et al. ............. 370/255 |
| 7,162,507 B2* | 1/2007 | Carter .......................... 709/200 |
| 7,190,471 B2 | 3/2007 | Sandfort et al. .............. 358/1.14 |
| 7,191,236 B2 | 3/2007 | Simpson-Young et al. .. 709/228 |
| 7,239,416 B2 | 7/2007 | Ohmura et al. ............... 358/1.18 |
| 7,256,906 B2 | 8/2007 | Nakajima .................... 358/1.15 |
| 7,295,524 B1* | 11/2007 | Gray et al. .................... 370/254 |
| 7,324,462 B1* | 1/2008 | Page et al. .................... 370/255 |
| 7,324,805 B2 | 1/2008 | Nakakita et al. .............. 455/411 |
| 7,343,086 B2 | 3/2008 | Shiohara |
| 7,346,268 B2 | 3/2008 | Shiohara |
| 7,346,269 B2 | 3/2008 | Shiohara |
| 7,372,485 B1 | 5/2008 | Bodnar et al. ................. 348/234 |
| 7,379,660 B2 | 5/2008 | Shiohara |
| 7,389,448 B2 | 6/2008 | Sakai |
| 7,411,607 B2 | 8/2008 | Kikugawa |
| 7,424,532 B1* | 9/2008 | Subbiah ........................ 709/226 |
| 7,440,459 B2 | 10/2008 | Casati .......................... 370/395 |
| 7,450,824 B2 | 11/2008 | Shiohara |
| 7,450,825 B2 | 11/2008 | Shiohara |
| 7,455,229 B2 | 11/2008 | Tanaka ..................... 235/462.01 |
| 7,466,357 B2 | 12/2008 | Myojo |
| 7,474,839 B2 | 1/2009 | Shiohara |
| 7,479,984 B2 | 1/2009 | Tanaka et al. ............. 348/207.2 |
| 7,502,049 B2 | 3/2009 | Aichi et al. |
| 7,502,855 B2 | 3/2009 | Swanson et al. ............. 709/225 |
| 7,519,697 B2 | 4/2009 | Matsukura ................... 709/223 |
| 7,523,212 B2 | 4/2009 | Woolf et al. ................. 709/230 |
| 7,535,588 B2 | 5/2009 | Wang et al. ................. 358/1.15 |
| 7,545,406 B2 | 6/2009 | Itsukaichi |
| 7,557,827 B2 | 7/2009 | Ishiyama et al. ........... 348/207.2 |
| 7,561,782 B2 | 7/2009 | Shiohara |
| 7,576,779 B2 | 8/2009 | Tanaka et al. ............... 348/211.4 |
| 7,600,050 B2 | 10/2009 | Aritomi ............................ 710/5 |
| 7,664,081 B2 | 2/2010 | Luoma et al. ................. 370/338 |
| 7,719,699 B2 | 5/2010 | Tojo |
| 7,719,706 B2 | 5/2010 | Suga et al. |
| 7,719,707 B2 | 5/2010 | Onuma et al. |
| 7,720,929 B2 | 5/2010 | Morohashi |
| 7,804,520 B2 | 9/2010 | Suehiro |
| 7,830,411 B2 | 11/2010 | Shiohara |
| 7,864,350 B2 | 1/2011 | Endo et al. |
| 7,876,358 B2 | 1/2011 | Yamada et al. |
| 7,880,910 B2 | 2/2011 | Aichi et al. |
| 7,881,715 B2 | 2/2011 | Kirani et al. |
| 7,889,385 B2 | 2/2011 | Toda |
| 7,936,918 B2 | 5/2011 | Silverbrook et al. |
| 7,949,223 B2 | 5/2011 | Shiohara |
| 7,961,345 B2 | 6/2011 | Yano et al. |
| 7,969,467 B2 | 6/2011 | Matsutani |
| 7,983,523 B2 | 7/2011 | Shiohara |
| 2001/0003191 A1 | 6/2001 | Kovacs et al. ................ 709/226 |
| 2001/0029531 A1 | 10/2001 | Ohta ............................ 709/223 |
| 2001/0048534 A1 | 12/2001 | Tanaka et al. |
| 2002/0026492 A1 | 2/2002 | Fujita ........................... 709/208 |
| 2002/0029277 A1 | 3/2002 | Simpson-Young et al. .. 709/228 |
| 2002/0030840 A1 | 3/2002 | Itaki ............................ 358/1.13 |
| 2002/0032748 A1 | 3/2002 | Myojo .......................... 709/217 |
| 2002/0041388 A1 | 4/2002 | Aoki ............................ 358/1.14 |
| 2002/0046228 A1 | 4/2002 | Scheifler et al. .................. 709/1 |
| 2002/0048455 A1 | 4/2002 | Tamura ........................... 396/18 |
| 2002/0062407 A1 | 5/2002 | Tateyama et al. ............... 710/11 |
| 2002/0075229 A1 | 6/2002 | Ito et al. ........................ 345/156 |
| 2002/0080250 A1 | 6/2002 | Ogawa et al. ................. 348/232 |
| 2002/0093682 A1 | 7/2002 | Nakajima .................... 358/1.16 |
| 2002/0097423 A1 | 7/2002 | Qiao ............................ 358/1.14 |
| 2002/0105678 A1 | 8/2002 | Shiraiwa ..................... 358/1.15 |
| 2002/0120750 A1 | 8/2002 | Nidd |
| 2002/0138671 A1 | 9/2002 | Struble .......................... 710/15 |
| 2002/0147819 A1 | 10/2002 | Miyakoshi et al. ........... 709/228 |
| 2002/0161740 A1 | 10/2002 | Nakamura ........................ 707/1 |
| 2002/0180879 A1 | 12/2002 | Shiohara ................. 348/333.05 |
| 2002/0194417 A1 | 12/2002 | Suzuki ......................... 710/305 |
| 2003/0002073 A1 | 1/2003 | Berkema et al. ............. 358/1.15 |
| 2003/0003933 A1 | 1/2003 | Deshpande et al. |
| 2003/0014446 A1 | 1/2003 | Simpson ....................... 715/277 |
| 2003/0016378 A1 | 1/2003 | Ozawa et al. ................ 358/1.13 |
| 2003/0041102 A1 | 2/2003 | Simpson ....................... 709/203 |
| 2003/0050963 A1* | 3/2003 | Lamming et al. ............ 709/203 |
| 2003/0056133 A1 | 3/2003 | Talley .......................... 713/323 |
| 2003/0078965 A1* | 4/2003 | Cocotis et al. ................ 709/203 |
| 2003/0081237 A1 | 5/2003 | Ogiwara et al. ............. 358/1.14 |
| 2003/0081251 A1 | 5/2003 | Tanaka et al. ............... 358/1.15 |
| 2003/0123840 A1 | 7/2003 | Fujinami ........................ 386/35 |
| 2003/0142016 A1* | 7/2003 | Pickup ......................... 342/387 |
| 2003/0156200 A1 | 8/2003 | Romano et al. |
| 2003/0156567 A1* | 8/2003 | Oak ............................. 370/338 |
| 2003/0185613 A1 | 10/2003 | Guddanti ........................ 400/61 |
| 2003/0208595 A1 | 11/2003 | Gouge et al. ................. 709/225 |
| 2004/0003060 A1 | 1/2004 | Asoh et al. ................... 709/220 |
| 2004/0009769 A1 | 1/2004 | Yokoyama ................... 455/423 |
| 2004/0019671 A1 | 1/2004 | Metz ............................ 709/223 |
| 2004/0021781 A1 | 2/2004 | Iida ............................. 348/231.3 |
| 2004/0039811 A1 | 2/2004 | Nakamura et al. ........... 709/223 |
| 2004/0095469 A1 | 5/2004 | Lin .............................. 348/207.2 |
| 2004/0102192 A1* | 5/2004 | Serceki ........................ 455/434 |
| 2004/0102977 A1 | 5/2004 | Metzler et al. ................ 704/275 |
| 2004/0137855 A1* | 7/2004 | Wiley et al. .................... 455/88 |
| 2004/0150724 A1* | 8/2004 | Nozaki et al. .............. 348/211.4 |
| 2004/0167974 A1* | 8/2004 | Bunn et al. ................... 709/223 |
| 2004/0169730 A1 | 9/2004 | Tamura et al. ............. 348/207.2 |
| 2004/0187157 A1 | 9/2004 | Chong et al. .................... 725/86 |
| 2005/0001024 A1 | 1/2005 | Kusaka et al. ................ 235/375 |
| 2005/0007617 A1 | 1/2005 | Tanaka et al. ............... 358/1.13 |
| 2005/0066197 A1 | 3/2005 | Hirata et al. .................. 713/201 |
| 2005/0122539 A1 | 6/2005 | Sugimoto |
| 2005/0128968 A1* | 6/2005 | Yang ............................ 370/312 |
| 2005/0174357 A1 | 8/2005 | Wang ........................... 345/581 |
| 2005/0270556 A1 | 12/2005 | Shimamura ................. 358/1.13 |
| 2006/0025076 A1 | 2/2006 | Yu ............................... 455/41.2 |

| | | | |
|---|---|---|---|
| 2006/0033812 A1 | 2/2006 | Yoshida et al. | 348/14.01 |
| 2006/0077455 A1 | 4/2006 | Watanabe | 358/1.15 |
| 2006/0105714 A1* | 5/2006 | Hall et al. | 455/41.3 |
| 2006/0111103 A1 | 5/2006 | Jeong et al. | 455/434 |
| 2006/0133414 A1 | 6/2006 | Luoma et al. | 370/466 |
| 2006/0183477 A1 | 8/2006 | Bocking et al. | 455/435.2 |
| 2006/0197976 A1 | 9/2006 | Oka | |
| 2006/0200564 A1 | 9/2006 | Watanabe et al. | 709/227 |
| 2006/0206592 A1* | 9/2006 | Fujii et al. | 709/220 |
| 2006/0212610 A1 | 9/2006 | Nago et al. | 710/16 |
| 2006/0212611 A1 | 9/2006 | Fujii et al. | 710/16 |
| 2006/0242304 A1 | 10/2006 | Hirose et al. | 709/227 |
| 2006/0252413 A1 | 11/2006 | Ikeda | 455/414.1 |
| 2007/0013781 A1 | 1/2007 | Kageyama et al. | |
| 2007/0030516 A1 | 2/2007 | Tsuji et al. | 358/1.15 |
| 2007/0060213 A1 | 3/2007 | Yoshida | 455/574 |
| 2007/0120955 A1 | 5/2007 | Shimosato | 348/14.01 |
| 2007/0153317 A1 | 7/2007 | Klein | 358/1.15 |
| 2007/0217332 A1 | 9/2007 | Nakahara | 370/229 |
| 2007/0220255 A1 | 9/2007 | Igarashi | 713/170 |
| 2007/0223046 A1 | 9/2007 | Shiraiwa | 358/296 |
| 2007/0223670 A1 | 9/2007 | Ido | 379/201.01 |
| 2007/0233834 A1 | 10/2007 | Hattori et al. | 709/223 |
| 2008/0068658 A1 | 3/2008 | Chen | 358/1.18 |
| 2009/0025081 A1 | 1/2009 | Quigley et al. | 726/21 |
| 2009/0177801 A1 | 7/2009 | Chambers, Jr. et al. | 709/250 |
| 2009/0179991 A1 | 7/2009 | Mohammad | 348/207.2 |
| 2009/0241072 A1 | 9/2009 | Chaudhri et al. | 715/863 |
| 2009/0323108 A1 | 12/2009 | Shimma | 358/1.15 |

FOREIGN PATENT DOCUMENTS

| | | |
|---|---|---|
| EP | 1 117 221 A2 | 7/2001 |
| EP | 1117221 A2 | 7/2001 |
| EP | 1133208 A2 * | 9/2001 |
| EP | 1 229 724 A2 | 8/2002 |
| GB | 2 354 832 A | 4/2001 |
| JP | 10-341303 A | 12/1998 |
| JP | 11-008625 A | 1/1999 |
| JP | 11-239312 | 8/1999 |
| JP | 2001-144767 | 5/2001 |
| JP | 2002-94531 | 3/2002 |
| JP | 2002-094604 | 3/2002 |
| JP | 2002-159053 A | 5/2002 |
| JP | 2002-185462 A | 6/2002 |
| JP | 2002-234232 A | 8/2002 |
| JP | 2002-244829 | 8/2002 |
| JP | 2002-330142 A | 11/2002 |
| JP | 2002345027 A * | 11/2002 |
| JP | 2002-373130 A | 12/2002 |
| JP | 2003-373130 A | 12/2002 |
| JP | 2003-085548 | 3/2003 |
| JP | 2003-091467 | 3/2003 |
| JP | 2004-110884 | 4/2004 |
| KR | 1989-0001306 | 2/1992 |
| WO | WO 01/37497 A1 | 5/2001 |
| WO | WO 01/93514 A1 | 12/2001 |
| WO | WO 2004/095778 A1 | 11/2004 |
| WO | WO 2004/098128 A1 | 11/2004 |
| WO | WO 2007/007758 | 10/2007 |

OTHER PUBLICATIONS

Eastman Kodak Company. "Kodak EasyShare-One zoom digital camera Users guide", 2005, 126 pages.*

Japanese Office Action dated Nov. 2, 2007, regarding Application No. 2003-118834 (with English translation).

Chinese Office Action dated Mar. 9, 2007, issued in counterpart application No. 2004800107431 (cited U.S. Patent Application Publication No. 2002-0032748 was previously cited in Nov. 29, 2005 Information Disclosure Statement).

Japanese Office Action dated Oct. 26, 2007, regarding Application No. 2003-119052.

Mango, "Guide to Bluetooth Mobile Phone", China Academic Journal Electronic Publishing House, China, 2002. (in Chinese, an English translation thereof is attached.).

Corcoran et al., "Wireless Transfer of Images From a Digital Camera to the Internet Via a GSM Mobile Phone", IEEE Transactions on Consumer Electronics, vol. 47, No. 3, Aug. 1, 2001, pp. 542-547, New York, NY, USA.

Digital Photography Review, "Direct Print Standard (DPS)," pp. 1 and 2, Dec. 2, 2002, available at http://www.dpreview.com/news/0212/02120101dps.asp.

Camera and Imaging Products Association, "PictBridge Overview," p. 1, Nov. 21, 2003, available at http://www.cipa.jp/pictbridge/contents_e/01pictbridge1_1_e.html.

Camera and Imaging Products Association, "PictBridge Direct-Printing Functions and Features," pp. 1 and 2, Oct. 5, 2003, available at http://www.cipa.jp/pictbridge/contents_e/01pictbridge1_2_e.html.

Digital Cameras Review Online, "PictBridge Technology and Digital Cameras," pp. 1-7, Oct. 23, 2004, available at http://www.digital-cameras-review-online.com/pictbridge.html.

* cited by examiner

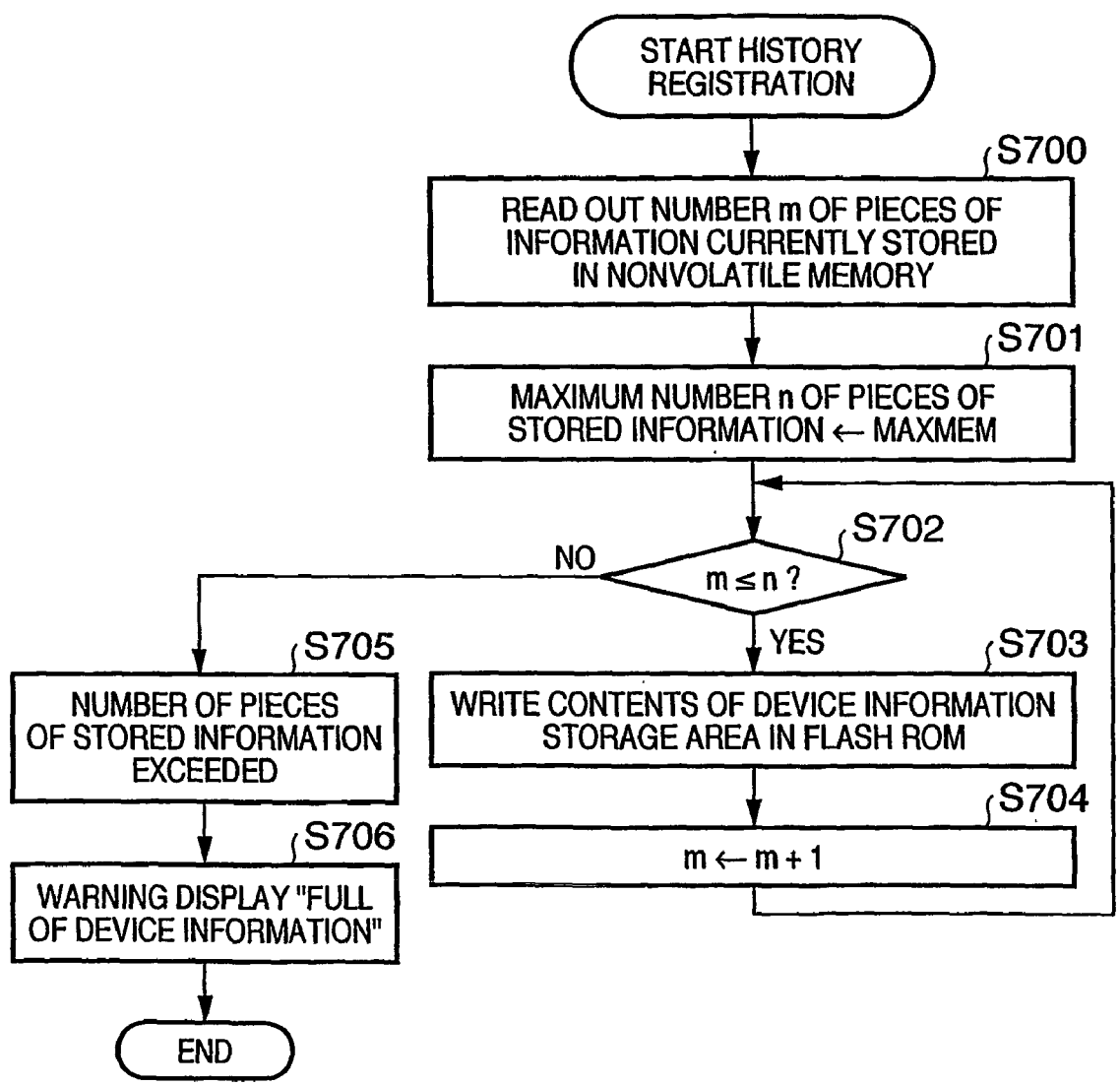

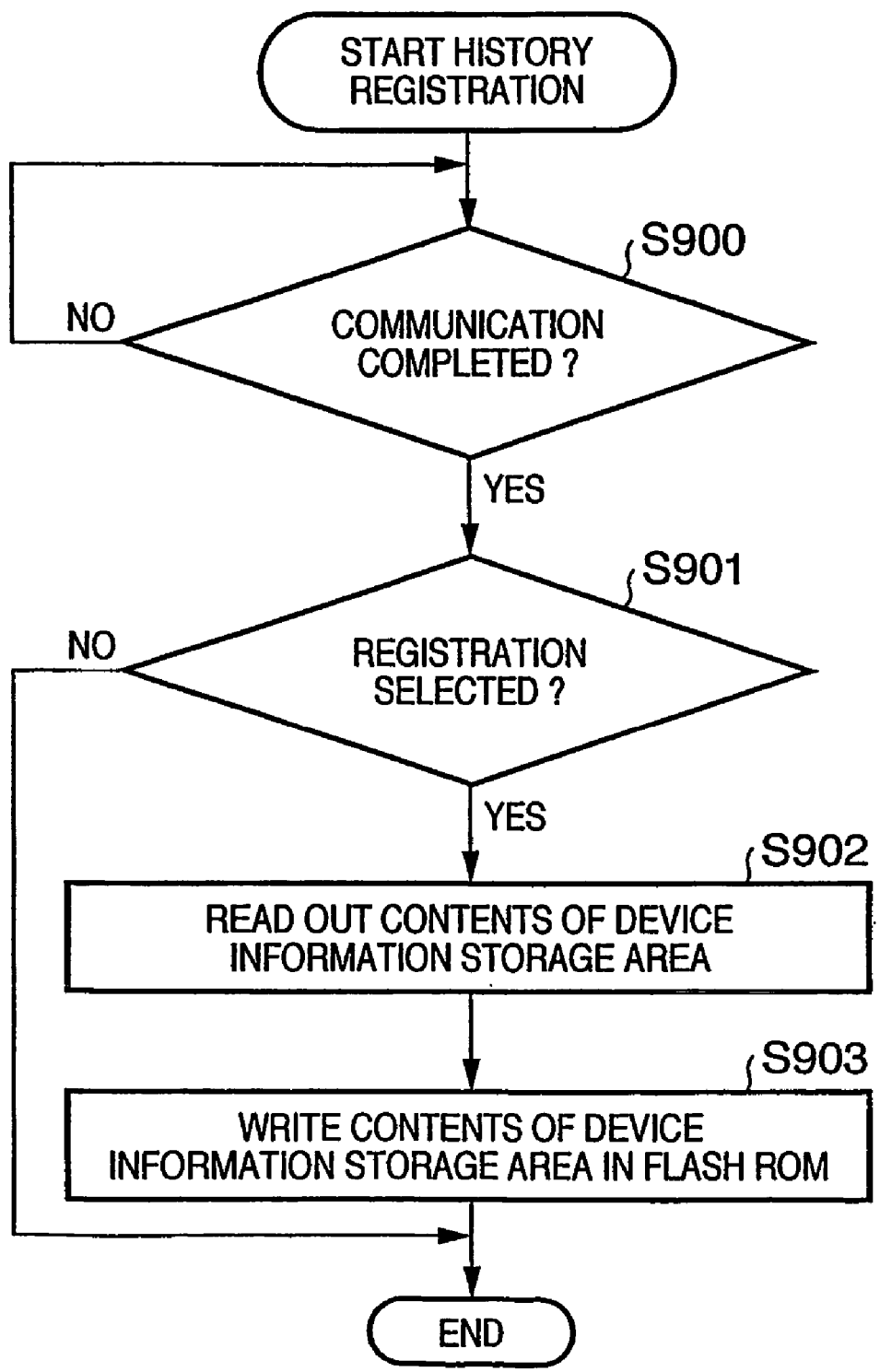

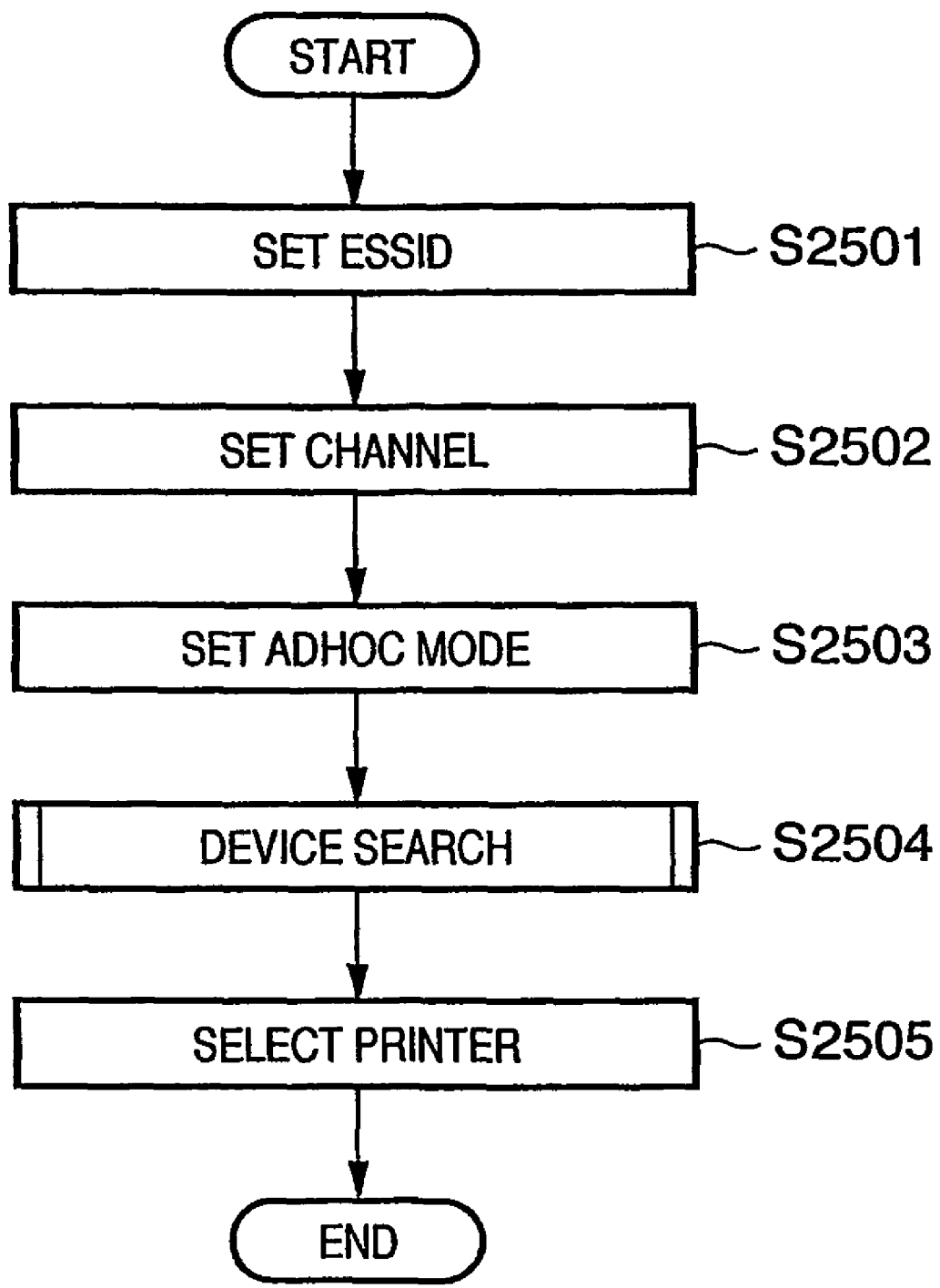

WIRELESS COMMUNICATION SYSTEM, AND WIRELESS COMMUNICATION DEVICE AND CONTROL METHOD

TECHNICAL FIELD

The present invention relates to a communication establishment technique between devices having wireless communication functions.

BACKGROUND ART

Normally, a host computer as a versatile information processing apparatus such as a personal computer or the like and a printer are connected by wire. Such wired connection adopts a USB cable, parallel cable (complying with the Centronics standards (USA)), Ethernet®, and the like.

In recent years, digital cameras have prevailed increasingly, and the recording quality of printers has improved as high as silver halide photos. Hence, there are many chances of printing images sensed by such digital camera by printers.

In order to print an image sensed by a digital camera, it is a common practice to transfer that image to a personal computer, and to print it by operating an application program that runs on the personal computer.

However, a digital camera user requires a personal computer when he or she wants to print sensed images, and much time and labor are required from when the user turns on the personal computer until he or she launches an application to print an image. Hence, such processes are far from an easy print process.

In consideration of such situation, the present applicant has proposed some techniques that directly connect a printer and digital camera by wire.

However, since such wired connection requires a connection cable as a matter of course, a demand has arisen for wireless information transmission, and wireless communications have begun to be used in communications between peripheral devices (e.g., printer—digital camera).

Hence, the current connection method of wireless communication devices between peripheral devices will be explained first.

FIG. 17 is a flow chart showing the conventional method upon searching for a printer to which data is to be transmitted from a digital camera when the adhoc mode of a wireless LAN is used as wireless communication means. FIG. 17 shows a flow chart executed when a new digital camera is brought into an existing wireless LAN communication system in the adhoc mode, and establishes connection to the printer.

Referring to FIG. 17, when the digital camera is connected to the printer in the adhoc mode, an ESSID (Extend Service Set Identify) is set in the digital camera (step S2501), a channel used in a wireless communication is set (step S2502), the adhoc mode as a wireless communication mode is set (step S2503), and devices on the wireless network are searched (step S2504). Then, the user selects a printer to be used in a print process from the devices on the wireless network (step S2505), thus establishing a communication channel.

However, in such prior art, in order to establish a wireless communication between wireless devices, parameters for the wireless communication must be set in respective wireless communication devices, and the user must select a desired partner device to communicate with from device names presented on the network. Hence, a wireless communication cannot be established unless the user makes complicated setup operations. Also, in case of wireless communication devices having a plurality of communication modes, a communication mode used to establish connection with a partner device must be taken into consideration, and knowledge about networks on some level is required, Therefore, such process is not for everyone.

DISCLOSURE OF INVENTION

The present invention has been made in consideration of the above situation, and has as its object to provide a wireless communication device which can establish a wireless communication between wireless communication devices and can provide a desired service without any complicated setup operations.

It is another object of the present invention to provide a wireless communication device which can establish wireless connection regardless of any communication mode.

In order to achieve such objects, for example, network identification information used at each frequency is detected by scanning beacons at respective frequencies, and a wireless communication device having a desired function is searched for using this network identification information. If the wireless communication device having a desired function is found, that wireless communication device is displayed as a selectable candidate, thus allowing the operator to select that device. These processes are repeated while sequentially changing the frequency until the operator's selection is made, thereby finding out a wireless communication device desired by the operator.

Also, by changing a search method depending on whether the received beacon is that in an adhoc communication mode or infrastructure communication mode, the operator can find a desired wireless communication device irrespective of a communication mode upon making a search.

Information associated with connection of a wireless communication device, the wireless communication to which has been established is stored, and is allowed to be re-used, thus saving time and labor when a communication is to be made again with the wireless communication device which has been communicated.

Upon searching for a new partner, wireless communication devices other than partners which have been communicated are searched, and a new partner can be quickly found out.

A wireless communication device that transmits an informing signal such as a beacon or the like appends device information of the self device to the informing signal upon transmission. A wireless communication device which is searching for a desired partner identifies the presence of a wireless communication device with a desired function on the basis of device information included in the received informing signal, and displays it as a selectable candidate, thus allowing an easy search of a communication partner.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

FIG. 7 is a flow chart showing the processing sequence of the digital camera according to the first embodiment of the present invention;

FIG. 9 is a flow chart showing the processing sequence of the digital camera according to the first embodiment of the present invention;

FIG. 17 is a flow chart showing the control of a conventional wireless communication device.

BEST MODE FOR CARRYING OUT THE INVENTION

Respective embodiments according to the present invention will be described hereinafter with reference to the accompanying drawings. Note that a description about connection of network devices (a digital camera, printer, storage, and the like) will be given hereinafter. A print process and a designation & transmission process of an image to be saved on the digital camera side, a reception & print process and the like on the printer side are the same as those to be executed upon wired connection, and a description thereof will be omitted.

First Embodiment

The first embodiment will explain a case wherein a device search is conducted for all frequencies that can be received in an environment without any network setups.

Figure 1:
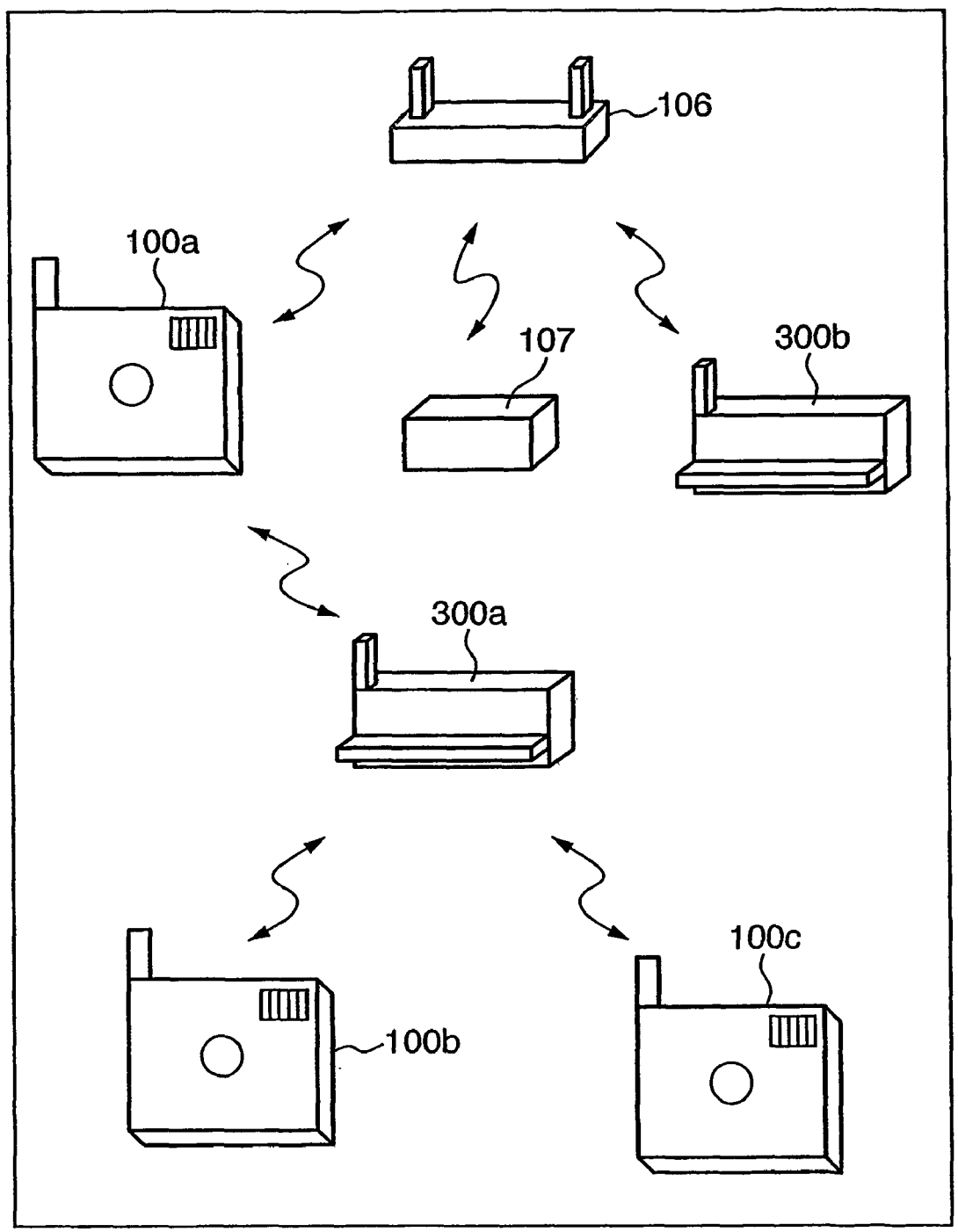
FIG. 1 is a block diagram showing the overall wireless communication system which comprises wireless communication devices according to an embodiment of the present invention.

FIG. 1 is a block diagram showing the overall arrangement of a wireless communication system in this embodiment.

Referring to FIG. 1, reference numerals 100a to 100c denote digital cameras which serve as communication devices on the information transmitting side having wireless communication means. Reference numerals 300a and 300b denote printers which serve as communication devices on the information receiving side having wireless communication means. Reference numeral 107 denotes a storage device which serves as a communication device on the information receiving side having wireless communication means.

The digital cameras 100a to 100c can make data communications using the wireless communication means among themselves or with the printers 300a and 300b and the storage device 107 via an access point 106 or directly.

Note that each printer is a device for printing image data transmitted from the digital camera, and the storage device is used to save (store) image data transmitted from the digital camera as a file.

Figure 2:
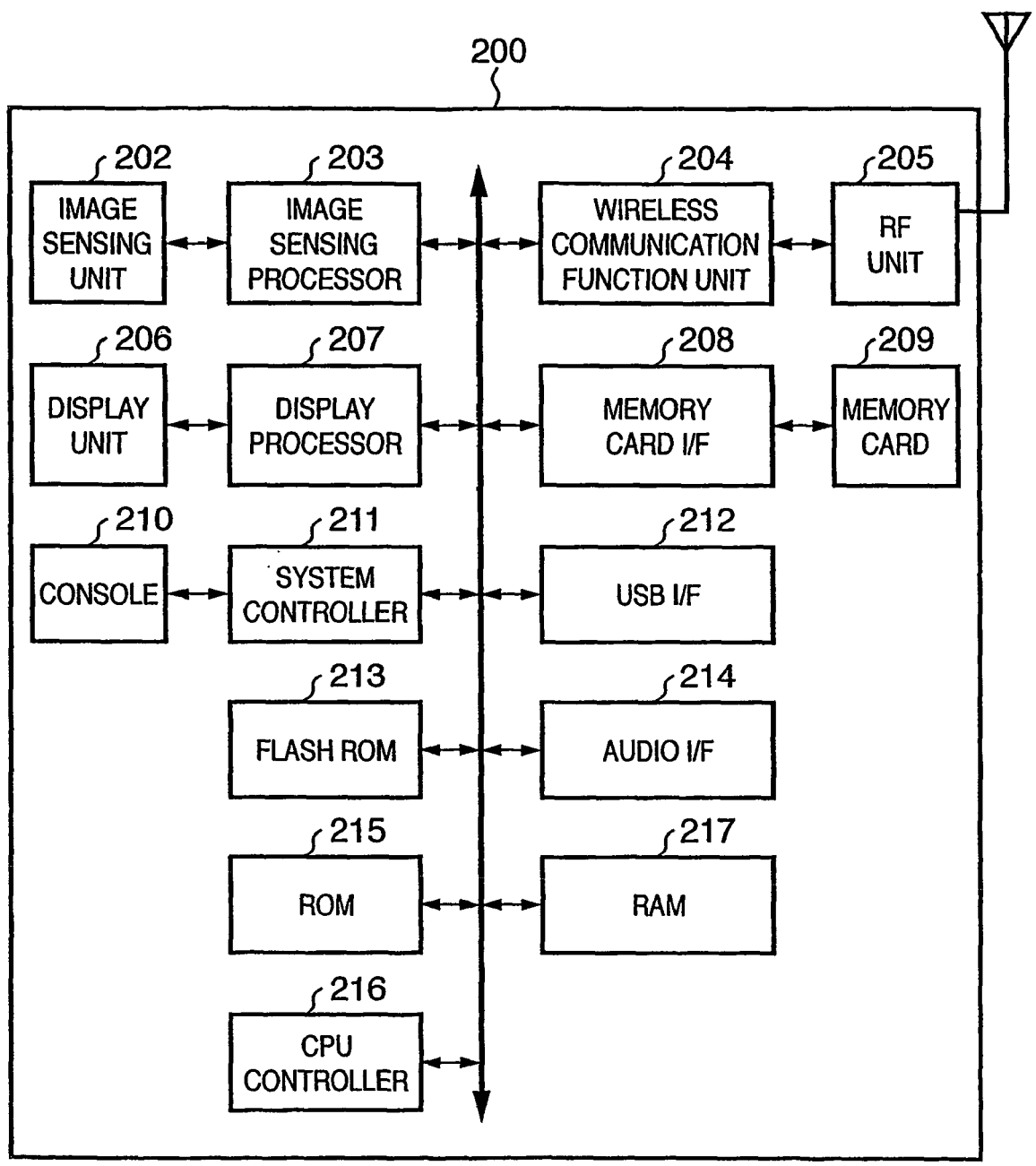
FIG. 2 is a block diagram showing the arrangement of a digital camera according to an embodiment of the present invention.

FIG. 2 is a functional block diagram showing the functional blocks of a digital camera 200 (corresponding to 100a to 100c in FIG. 1). A console 210 of the digital camera is connected to a CPU controller 216 via a system controller 211, and comprises a shutter and various operation switches and buttons of the digital camera. An image sensing unit 202 is a block that senses an image upon depression of the shutter, and is processed by an image sensing processor 203. A display unit 206 is a block that presents information to the user by means of, e.g., LCD display, LED indication, audio presentation, and the like, and is processed by a display processor 207. Note that the console 210 and display unit 206 form a user interface of the digital camera.

A wireless communication function unit (IEEE802.11 in this embodiment) 204 is a block that makes wireless communications, and an RF unit 205 exchanges a wireless signal with another wireless communication device. A memory card I/F 208 is an interface used to connect a memory card 209, a USB I/F 212 is an interface used to connect an external device using USB, and an audio I/F 214 is an interface used to connect an audio signal with an external device. These functional blocks shown in this block diagram are processed under the control of the CPU 216. Programs to be controlled by the CPU are stored in a ROM 215 or flash ROM 213. Data to be processed by the CPU are written in or read out from a RAM 217, the flash ROM 213, or the memory card 209 via the memory card I/F 208.

Figure 3:
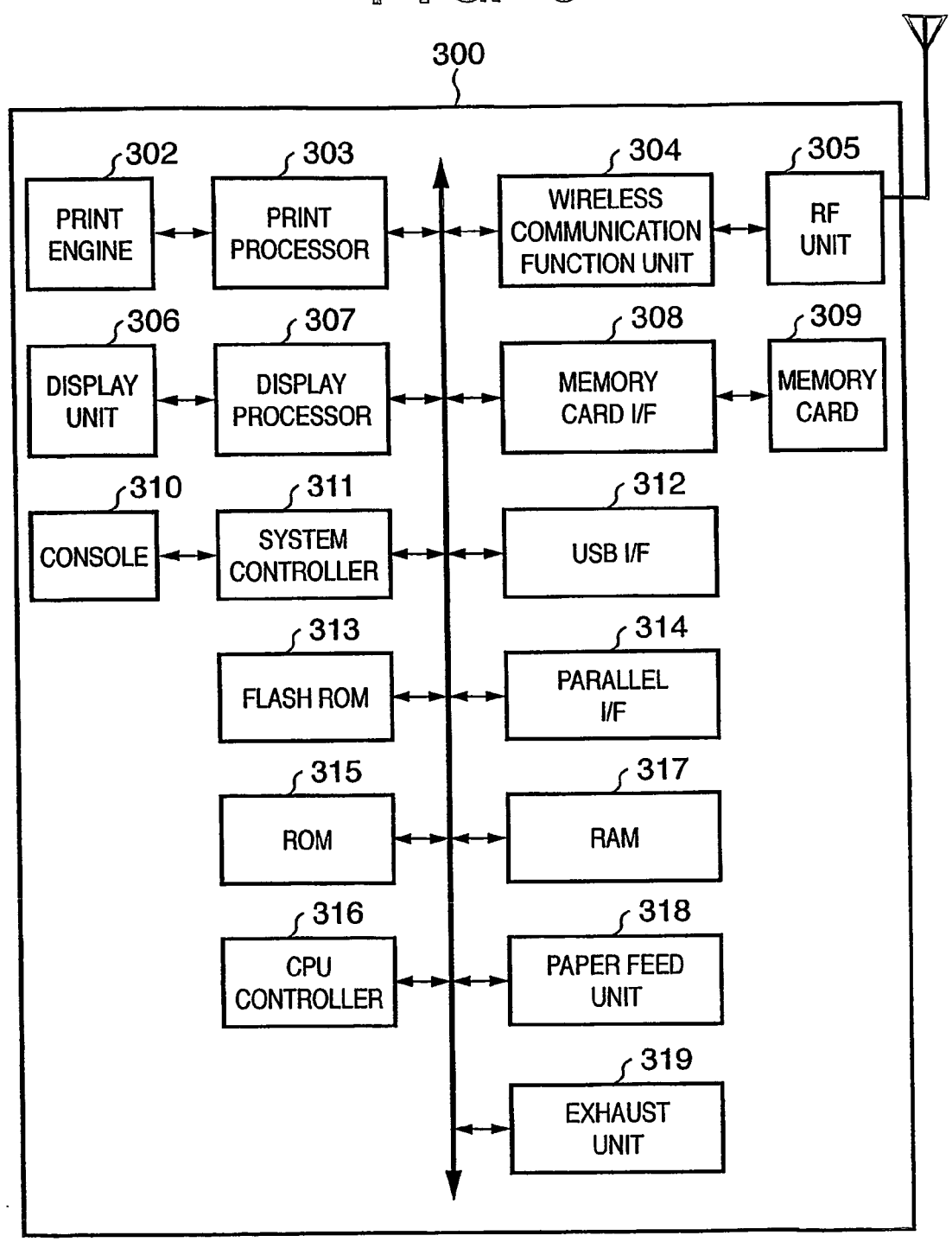
FIG. 3 is a block diagram showing the arrangement of a printer according to an embodiment of the present invention.

FIG. 3 is a functional block diagram showing functional blocks of a printer 300 (300a or 300b shown in FIG. 1). A console 310 of the printer is connected to a CPU controller 316 via a system controller 311, and includes a button used to establish a communication channel used in this embodiment and the like. A print engine 302 is a functional block which actually prints an image on a paper sheet, and is processed by a print processor 303. A paper feed unit 318 feeds a paper sheet, the print processor 303 executes a data print process, and an exhaust unit 319 exhausts the paper sheet. A display unit 306 is a block which presents information to the user by means of LCD display, LED indication, audio presentation, and the like, and is processed by a display processor 307. The console 310 and display unit 306 form a user interface of the printer.

A wireless communication function unit (IEEE802.11 in this embodiment) 304 is a block that makes wireless communications, and an RF unit 305 exchanges a wireless signal with another wireless communication device. A memory card I/F 308 is an interface used to connect a memory card 309, a USB I/F 312 is an interface used to connect an external device using USB, and a parallel I/F 314 is an interface used to connect an external device (e.g., a personal computer or the like) using a parallel communication. These functional blocks shown in this block diagram are processed under the control of the CPU 316. Programs to be controlled by the CPU are stored in a ROM 315 or flash ROM 313. Data to be processed by the CPU are written in or read out from a RAM 317, the flash ROM 313, or the memory card 309 via the memory card I/F 308.

Figure 4:
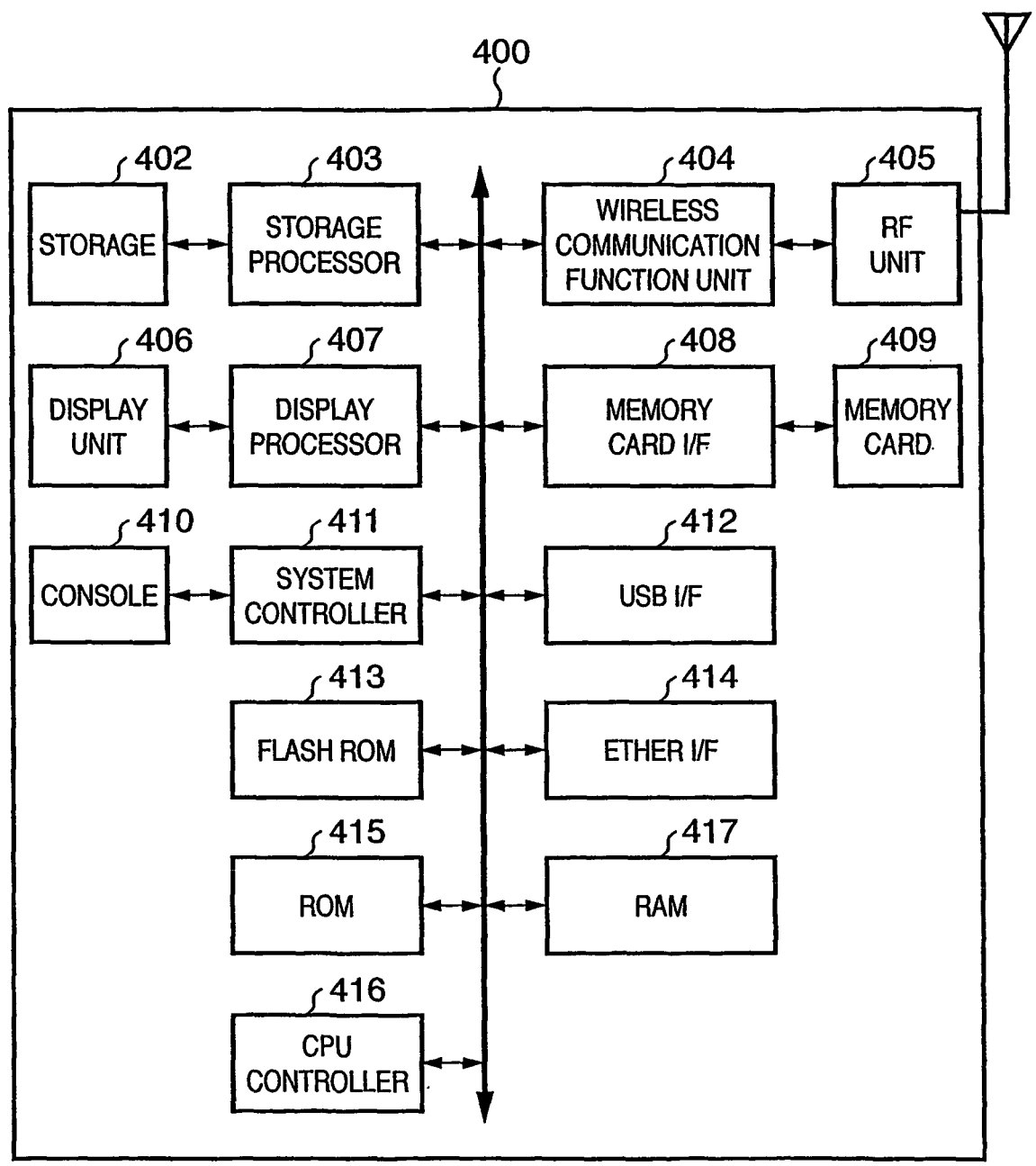
FIG. 4 is a block diagram showing the arrangement of a storage device according to an embodiment of the present invention.

FIG. 4 is a functional block diagram showing the functional blocks of a storage device 400 (corresponding to the storage device 107 in FIG. 1) in this embodiment.

A console 410 of the storage device 400 is connected to a CPU controller 416 via a system controller 411. A storage 402 is a functional block that stores or reads out data, and is processed by a storage processor 403. As the storage 402, a large-capacity storage device, i.e., a hard disk drive, is preferably used. In some cases, a media write drive for CD-R or CD-RW media, rewritable DVD media, MO media, and the like as relatively large-capacity, portable storage media may be used. A display unit 406 is a block which presents information to the user by means of LCD display, LED indication, audio presentation, and the like, and is processed by a display processor 407. An operation for selecting desired one of information displayed on the display unit 406 is made via the console 410. The console 410 and display unit 406 form a user I/F of the storage device 400.

A wireless communication function unit (IEEE802.11 in this embodiment) 404 is a block that makes wireless communications, and an RF unit 405 exchanges a wireless signal with another wireless communication device. A memory card I/F 408 is an interface used to connect a memory card 409 (to receive a memory card of the digital camera and to directly save data in that card), a USB I/F 412 is an interface used to connect an external device using USB, and an ETHER I/F 414 is an interface used to connect an external device using an ETHER communication. These functional blocks shown in this block diagram are processed under the control of the CPU 416. Programs to be controlled by the CPU are stored in a ROM 415 or flash ROM 413. Data to be processed by the CPU 416 are written in or read out from a RAM 417 or the flash ROM 413. The flash ROM 413 is a nonvolatile storage area, which stores wireless communication setup information and the like.

In the arrangements of the aforementioned devices, processes for printing images sensed by the digital camera using the printer and saving (storing) such images in the storage device are implemented via wireless communications.

The detailed operations of the devices in this embodiment will be described below.

Figure 5A:
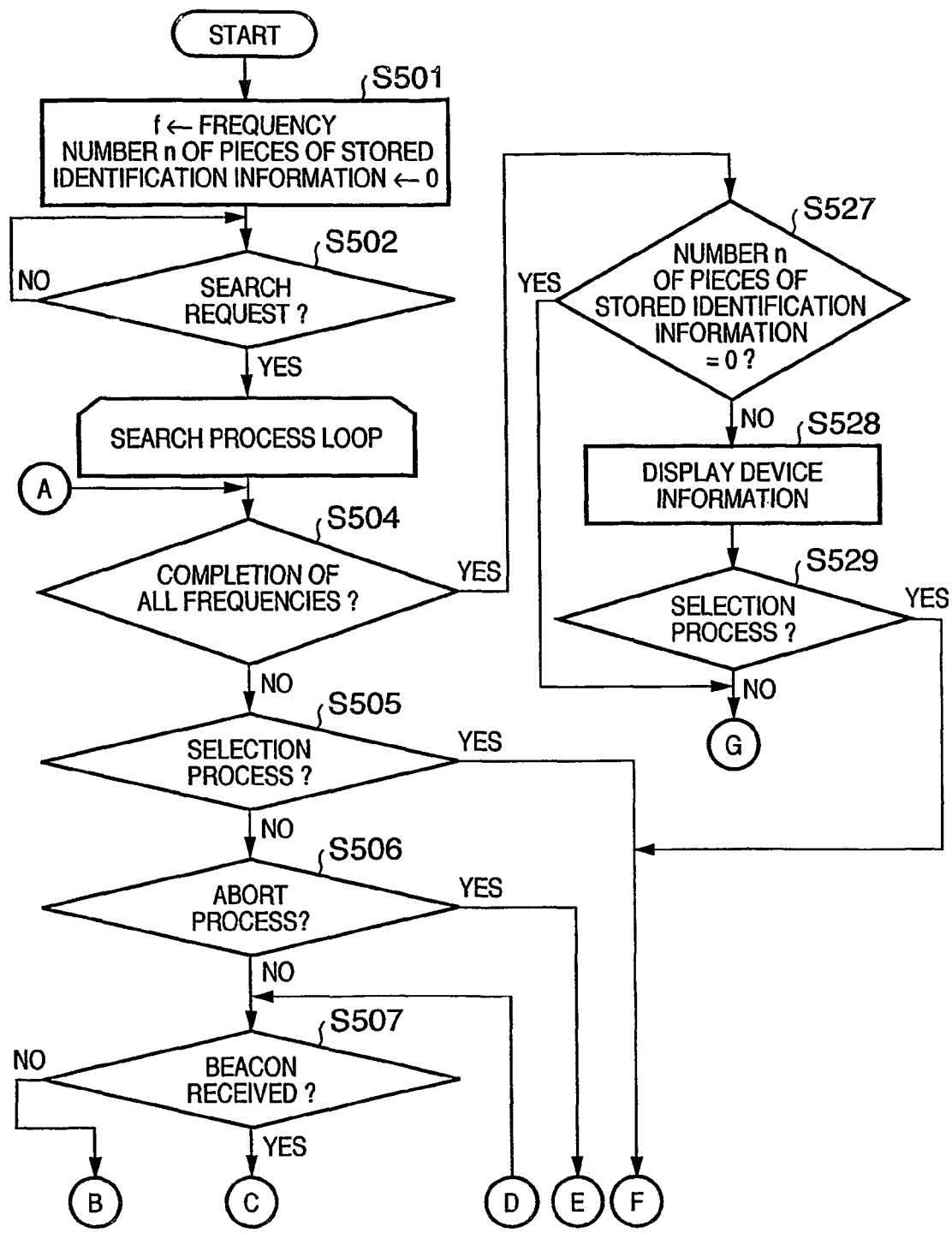
FIGS. 5A to 5C are flow charts showing the operation of the digital camera according to the first embodiment of the present invention.
Figure 5B:
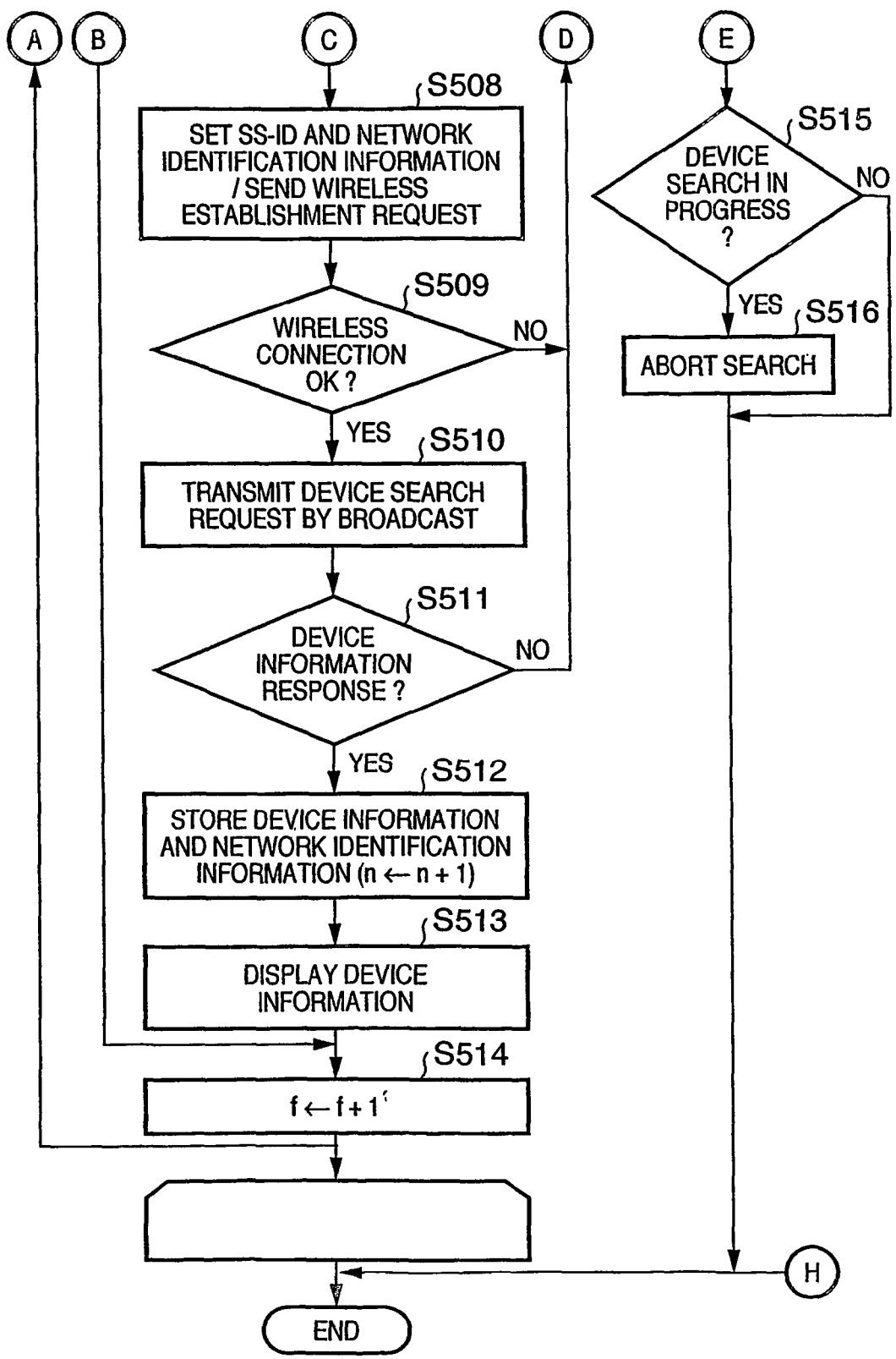
Figure 5C:
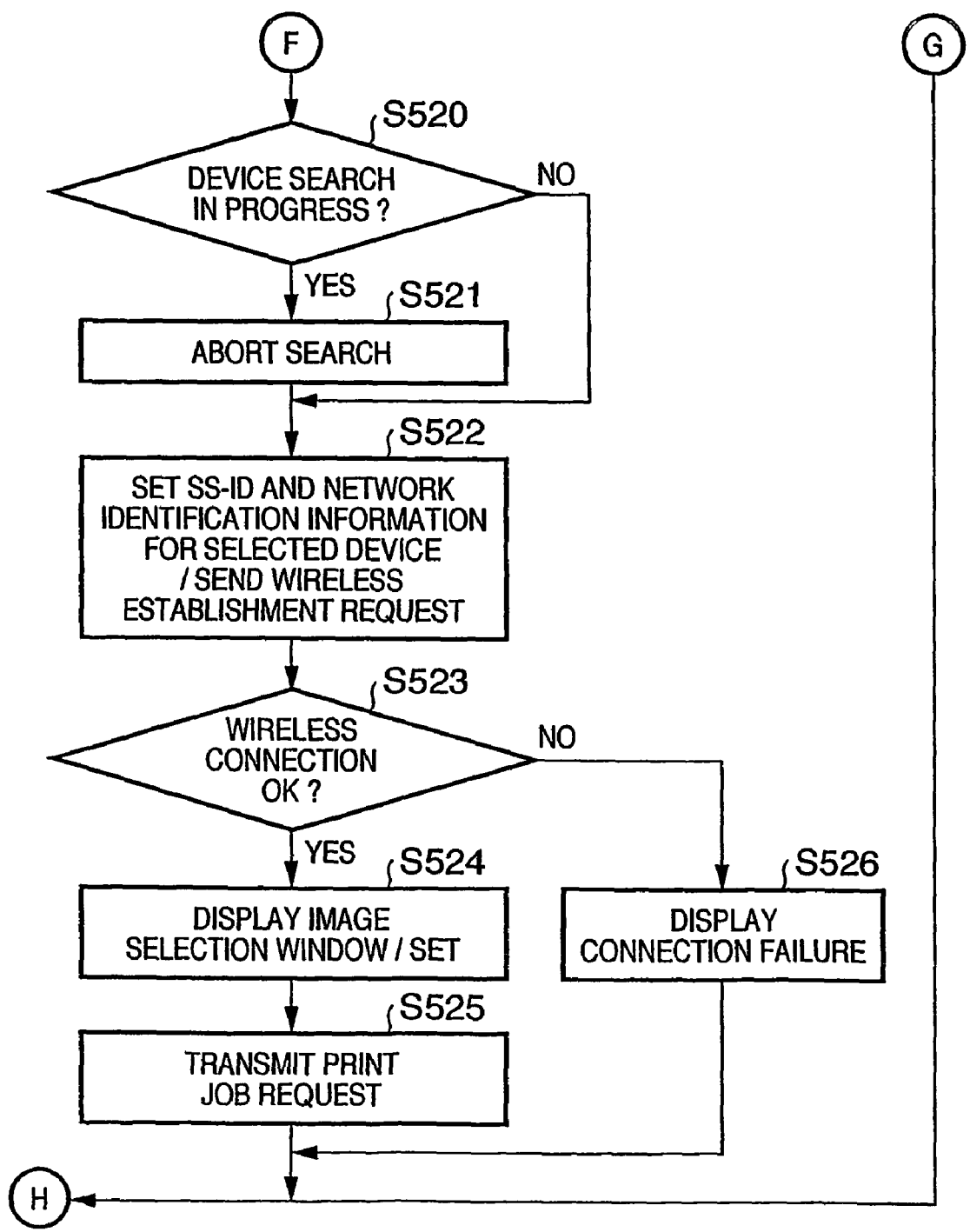

FIGS. 5A to 5C are flow charts showing the control of the digital camera 200 of this embodiment.

In the following description, assume that the process shown in FIGS. 5A to 5C is done by the digital camera 200 for the sake of simplicity.

Assume that the user has selected the use of the printer 300 at the digital camera. Although not specified in FIGS. 5A to 5C, the digital camera 200 may have a user interface that allows the user to select a print mode.

Since the frequency or the like of the printer location is unknown upon searching for the printer 300, a frequency as an initial value is set in f, and 0 (zero) is set in variable n that stores the number of pieces of stored device identification information (step S501). A search request is sent to the wireless communication function unit 204 (step S502). The digital camera 200 repeats the following process as a search process.

It is checked if the search process is complete for all receivable frequencies (step S504). If frequencies to be received still remain, it is checked if the user has made a device selection process (step S505). If the user has not made a device selection process, it is then checked if the user has made a search abort process (step S506). If the user has not made a search abort process, Beacon signals are scanned and received for a predetermined period of time to acquire and collect SS-IDs and network identification information from the Beacon signals transmitted at the current frequency (step S507). Although not specified herein, passive and active scan modes are available as a scan reception mode. In case of the active scan mode, a Probe signal is output to receive a Beacon as a response. Upon completion of scan reception of the Beacons, a wireless establishment request to the network is transmitted in accordance with each collected SS-ID and network identification information (step S508). If wireless connection is OK (step S509), a device search request used to search for a wireless device with a desired function (e.g., a print function, storage function, or the like) is broadcasted (step S510). On the other hand, if wireless connection is NG, Beacon signals are received again (step S507).

Upon reception of a response to the device search request (step S511), device information and network identification information successively received as a response, and a frequency (channel) at that time are stored in the RAM 217 as a storage area (step S512).

Next, the stored device information is displayed (step S513). The frequency is changed (step S514) to repeat processes in steps S508 to S513 for all the collected SS-IDs and network identification information. If such repetitive processes are complete for all the frequencies (step S504), and if the number of pieces of stored device identification information is not 0 (zero) (step S527), a list of stored device information is displayed (step S528), and it is checked if the user has selected a device from the displayed list (step S529). If the user has selected a device, the flow advances to step S520; if selection has not been made for a predetermined period of time, the flow ends. On the other hand, if the user has made the device selection process during the repetitive processes in step S505, the flow advances to step S520. When the selection process has been made in step S505 or S529, if the device search process is in progress (step S520), the device search process is aborted (step S521). Then, network identification information is set for the selected device, and a wireless communication establishment request is transmitted (step S522). If wireless connection has succeeded (step S523), an image selection window used to select an image to be transmitted is displayed and a setup process (a setup process of the number of copies to be printed, print type, and the like) is made (step S524). Furthermore, a print job request based on the above setup is transmitted (step S525). On the other hand, if wireless connection has failed, a connection failure display is made (step S526).

The operation of the printer 300 will be described in detail below using FIGS. 6A and 6B.

In the printer, upon reception of an image data wireless reception instruction from the digital camera, it is checked if the wireless communication mode of the self device is an adhoc mode as direct connection (step S601) or an infrastructure mode that makes a communication via the access point 106 (step S605). If the printer operates in the adhoc mode, frequency f is set (step S602), network identification information is set (step S603), and Beacon transmission starts (step S604). On the other hand, in case of the infrastructure mode, frequency f is set (step S606), network identification information is set (step S607), and an associate process is executed (step S608). The control waits until the associate process with the access point 106 is completed (step S609). If the current wireless communication mode is neither the adhoc mode nor the infrastructure mode, a default wireless communication mode is set (step S615) to redo a communication process from the beginning.

After the process routine for either of the two modes, it is checked if a search request is detected (step S610). If the search request is detected, a device information response which includes the ID of the self device, printer name, serial number, vendor code, and the like is transmitted (step S611). The control then waits for a print job request (step S612). Upon reception of the print job request, data designated by that print job request is acquired and printed, and a status notification process that notifies of job progress status is executed (step S613). The control waits until the print job is completed (step S614).

Note that the processes of the digital camera and printer have been explained. Also, the same applies to processes between the digital camera and storage device, i.e., a case wherein image data sensed by the digital camera is wirelessly received, and is saved (stored) as a file. The processes of the storage device can be substantially the same as those shown in FIGS. 6A and 6B, except that it is checked in step S612 in FIG. 6B if a save request is detected, the data acquisition/save/status notification processes are made in step S613, and it is checked in step S614 if a save job is completed.

When the digital camera and printer (or storage) execute the aforementioned processes, the digital camera user need only issue a wireless communication establishment instruction. Hence, the location of a wireless LAN is detected by receiving Beacon signals, and parameters required for a wireless communication at that time are automatically set to search for a device, thus simplifying the setup process required for the wireless communication. Every time a device is found, identification information of that device is displayed on the display unit 206. If a target device is displayed, the user can select that device to abort the subsequent search process, and can immediately make a transmission procedure of a sensed image.

Figure 11:
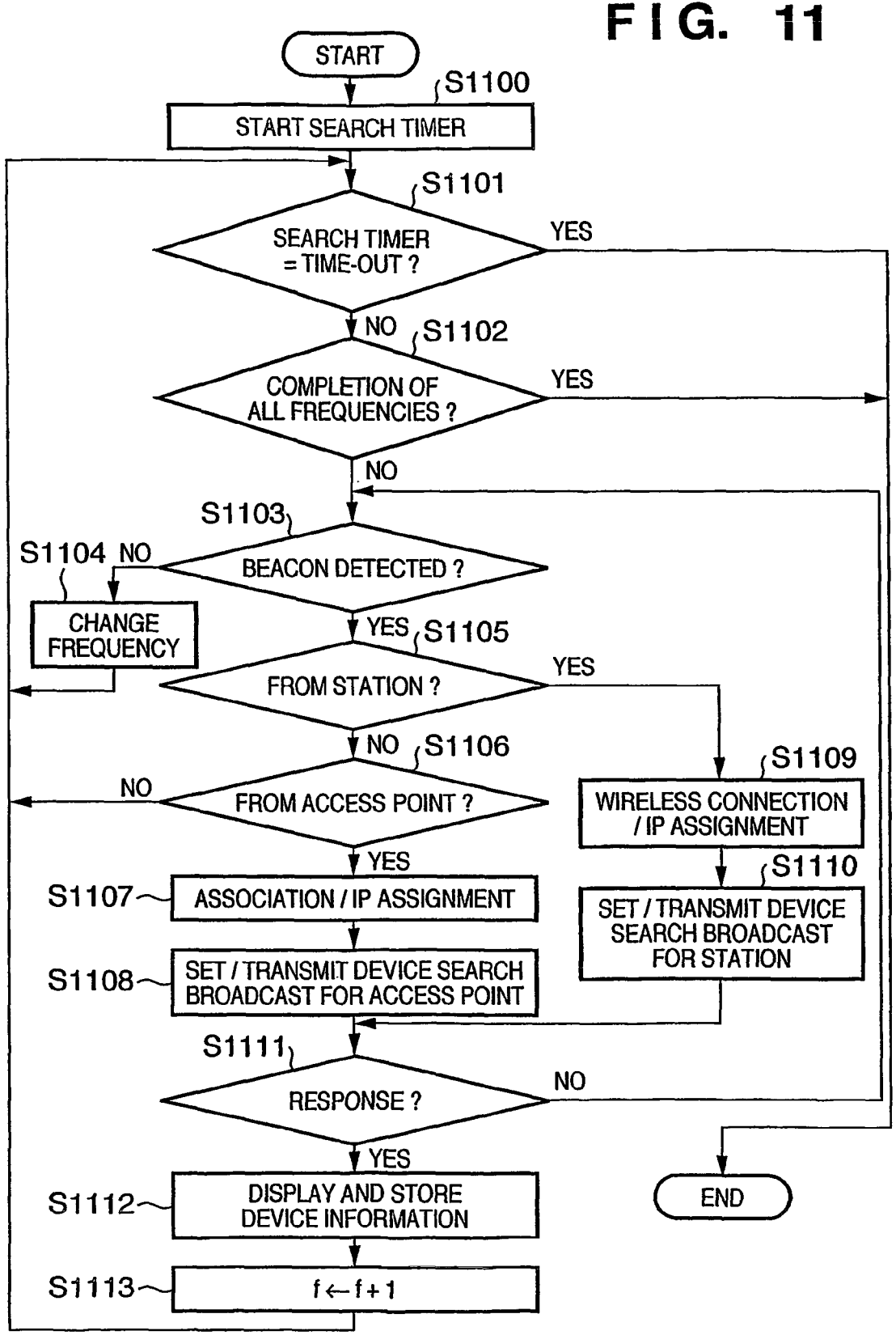
FIG. 11 is a flow chart showing the processing sequence of the digital camera according to the first embodiment of the present invention.

A process for setting the adhoc mode as direct connection or the infrastructure mode that makes a communication via the access point 106 as the wireless communication mode used upon searching for device information by the digital camera 200 without any special operation will be explained below with reference to the flow chart of FIG. 11.

Upon detection of the operation of a wireless connection instruction button (not shown) on the user interface of the digital camera 200, a search timer used in a device search process is started (step S1100). The following processes are repeated until either of the following two conditions is met, i.e., until the search timer reaches a time-out (step S1101) or search processes for all the frequencies are completed (step S1102).

An attempt is made to detect a Beacon (step S1103). Since the digital camera 200 can identify based on the signal contents if the Beacon signal has come from a station or access point) (steps S1105 and S1106), if the Beacon signal has come from the station, wireless connection is established to receive an assigned IP address (step S1109), and a device search broadcast request is set and transmitted to the partner station (printer or storage) (step S1110). If a response is detected (step S1111), device information included in the response contents is displayed, and is stored in the flash ROM 213 as a nonvolatile memory (step S1112). On the other hand, if the Beacon signal has come from the access point, an associate process with the access point is executed to receive an assigned IP address (step S1107), and a device search broadcast request is set and transmitted to the access point (step S1108). If a response to that request is detected, device information included in the response contents is displayed, and is stored in the flash ROM 213 as a nonvolatile memory in step S1112. After that, the frequency is changed (step S1113) to repeat the processes in step S1101 and subsequent steps until the search timer reaches a time-out or search processes for all the frequency are completed.

Detailed processes executed when the digital camera 200 acquires device information will be described below with reference to the flow charts of FIGS. 7, 8, and 9.

FIG. 7 shows processes (a part of the process in step S1112 in FIG. 11) executed when the acquired device information is stored in a nonvolatile memory (flash ROM in this embodiment). Since the capacity of the nonvolatile memory is limited, the number m of pieces of device information currently stored in the nonvolatile memory is checked (step S700). Next, the maximum number n of pieces of device information that can be stored in the nonvolatile memory is set as MAXMEM (step S701). It is checked if $m \leq n$, i.e., if another device information can be stored (step S702). If another device information can be stored, device information which is acquired by the device search request and is stored in a device information storage area is written in the flash ROM 213 (step S703). Then, m indicating the number of pieces of currently stored device information is incremented by 1 (step S704) to repeat these process until m reaches n. If the maximum number of pieces of device information that can be stored has been reached (step S705), information "full of device information" is displayed as a warning message (step S706), thus ending the process.

Figure 8:
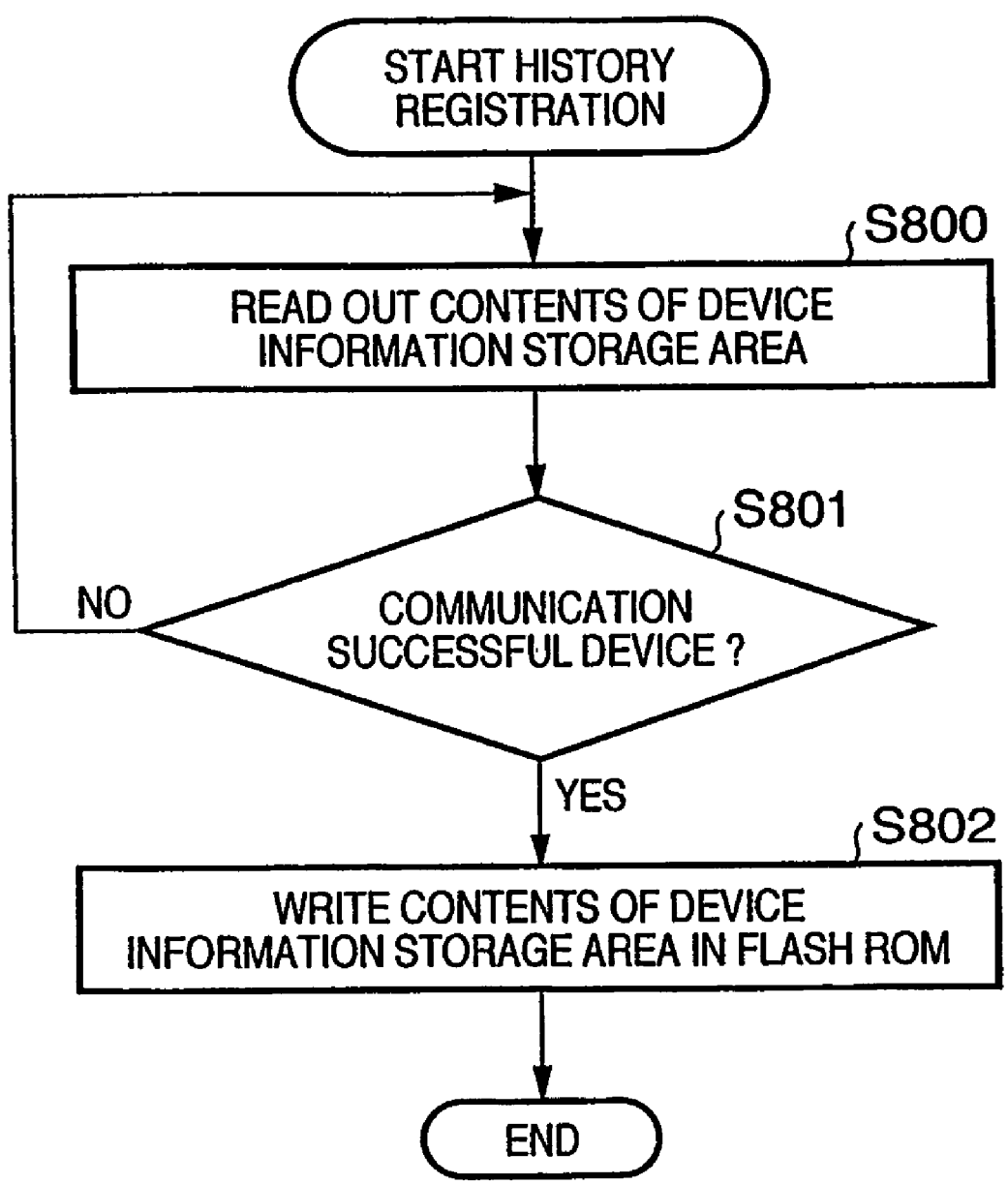
FIG. 8 is a flow chart showing the processing sequence of the digital camera according to the first embodiment of the present invention.

FIG. 8 shows processes executed when it is checked if a communication has succeeded, and only device information corresponding to the successful communication is stored in the flash ROM upon storing the acquired device information in the nonvolatile memory (flash ROM 213). The contents of the device information storage area are read out (step S800). The device information storage area stores information indicating if a communication has succeeded to form a pair with the device information. If the device information corresponds to that of a successful communication device (step S801), the contents of the device information storage area are written in the flash ROM 213 as a nonvolatile memory (step S802).

FIG. 9 shows an example when means that prompts the user to select whether or not the device information of the wireless communication device of interest is registered is provided after a communication. Upon completion of a communication (S900), a window that prompts the user to select whether or not the device information of interest is to be registered is displayed (S901). If the user selects registration, the contents of the device information storage area are read out (S902), and are written in the nonvolatile memory (S903).

In this way, after device information is searched, such information is stored as history information, thus designating a device to be connected within a short period of time upon making a second search process. Also, since the user can select whether or not device information is to be registered after completion of a communication, he or she can make selection of non-registration when that device is to be temporarily used in the flow of a series of communication processes, thus improving the operability. Hence, an effect unique to this embodiment can be provided.

In the above description, the flash ROM has been exemplified as nonvolatile storage means (nonvolatile memory). Also, the same result can be obtained if information is stored in the memory card 209.

Second Embodiment

The second embodiment of the present invention will be described below. In the second embodiment, the detailed operation of the digital camera 200 which has a history search mode that searches history for a device to communicate with (without any wireless communication for the search process in practice), and a new search mode that searches for a new device will be described below using the flow chart of FIGS. 10A to 10C.

Upon operation of a device search instruction button (one of history search and new search buttons) of the digital camera, the number m of pieces of already stored history information (device identification information, SSIDs, and the like) is set, counter i indicating an index of a device information table stored in a history information storage area is reset to 0 (zero), and history information such as identification information, SSID at that time, and the like of each previously connected device (printer or storage), which is stored in the flash ROM 213, is stored in an area assured in the RAM 217. At this time, the power supply of the wireless communication function unit 204 is OFF.

Assume that a new search mode is selected as a search mode (step S1001). In case of the new search mode, the power supply of the wireless unit is immediately turned on, and a timer that measures a search time is started (step S1002). If a Beacon is detected during the search process (step S1003), it is compared if the history information stored in the history information area matches network identification information (SSID) of the detected Beacon (steps S1004, S1005, S1006, and S1007).

In is checked in steps S1004 to S1006 if history information stored in the history information area matches network identification information indicated by the Beacon detected in step S1003. If i≧m, it is determined that new connection must be established to a network indicated by the currently detected Beacon. In step S1009, a device search request is broadcasted via that network, and device identification information and network identification information detected at that time are stored in the history information area and are also registered in the flash ROM 213. In this case, m is incremented by 1. Then, that device identification information is displayed (step S1010).

If network identification information that matches the stored one is found, since it indicates that the detected network identification information has already been stored as history information, variable i is reset to 0 in step S1007, and next new network identification information is set, thus repeating a search process for information that does not match history information.

In this way, the device search process is repeated until the timer reaches a time-out.

If it is determined that the timer has reached a time-out, it is checked if one or more devices can be found by search (step S1020). If no device is found, an error message that advises accordingly is displayed (step S1021), and the power supply of the wireless unit is turned off (step S1022), thus ending this process.

If it is determined that one or more devices are found, the flow advances to step S1023, and the user interface of the digital camera displays a list of device information and prompts the user to select one device from the list. It is checked in step S1024 if a communication is established to the selected device (step S1024). If connection is NG, the flow advances to step S1021. On the other hand, if it is determined that a wireless communication can be established, an output process of required image data is executed for that device (printer or storage) (step S1025). Upon completion of output of a desired image (or a plurality of images), the flow advances to step S1022 to turn off the power supply of the wireless unit.

On the other hand, if it is determined in step S1001 that the history search mode is selected, the following process is executed.

Index i to the history table is set to be an initial value (step S1011) to repeat the subsequent processes until a device selection process is done (yes in step S1014) or the process is to end (abort process; yes in S1016).

History information area[i] is set to be the current device identification information, and that information is displayed on the display unit 206 (steps S1012 and S1013). The user can select that displayed device (step S1014), "end" (step S1016), or to display the next device (step S1017). If the displayed device is selected, the power supply of the wireless communication function unit 204 is turned on (step S1015). The flow then advances to step S1024 to try to establish connection using the identification information and SSID of the selected device. The subsequent processes are the same as those described above.

If the user selects "end" (S1016), the flow advances to step S1021 to display an error message indicating an abort process.

Steps S1018 and S1019 are processes for switching device information to be displayed. In this case, device information to be displayed is switched by pressing one of right and left keys. Of course, the present invention is not limited to such specific operation.

In this manner, since the new search mode and history search mode are provided upon searching for device information, power ON/OFF of the wireless unit can be flexibly controlled in accordance with the selected mode, and the power supply of the wireless unit is turned on only when a wireless communication is required, thus expecting to obtain a power saving effect in addition to the first embodiment.

Figure 10A:
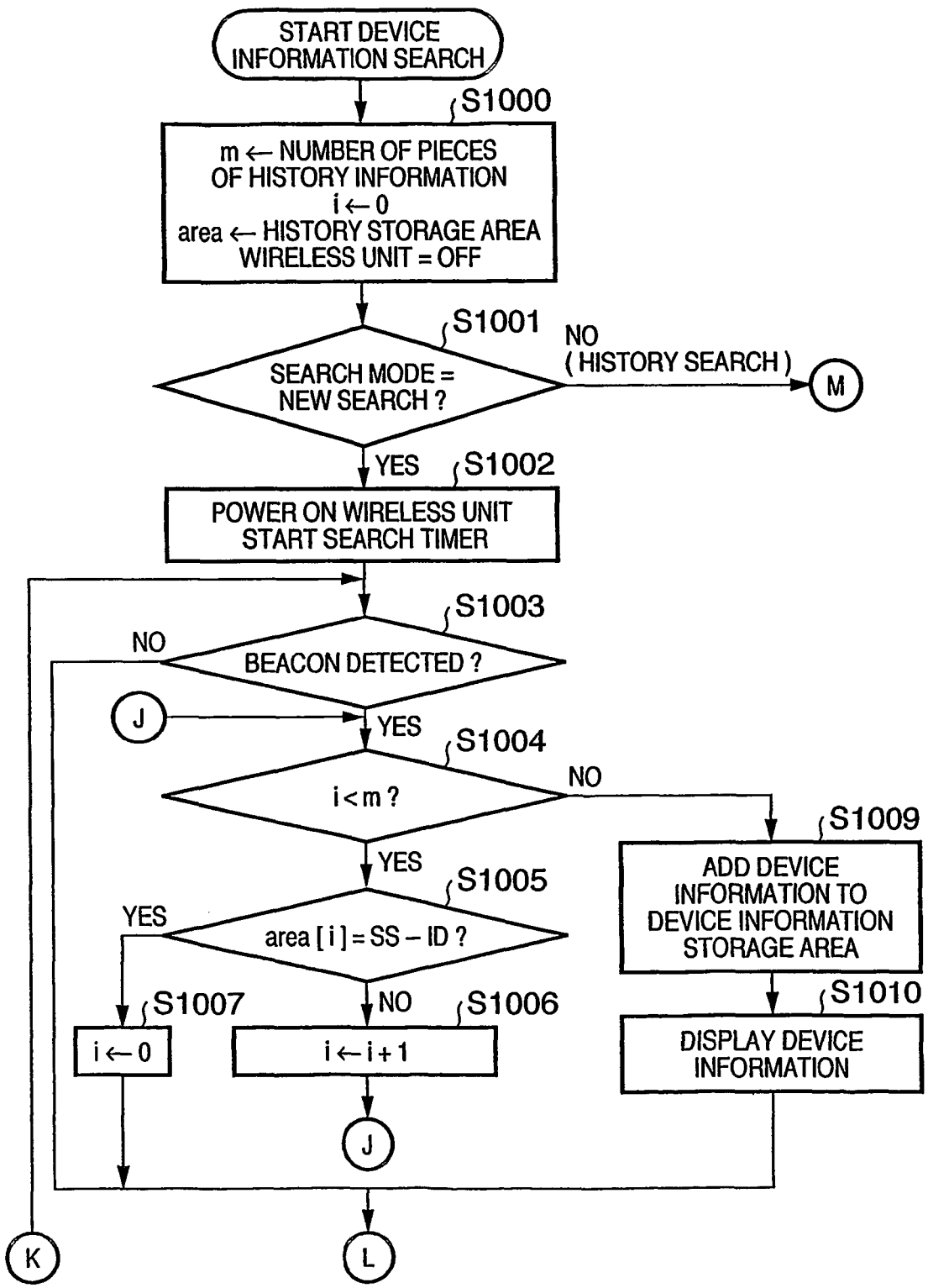
FIGS. 10A to 10C are flow charts showing the processing sequence of the digital camera according to the second embodiment of the present invention.
Figure 10B:
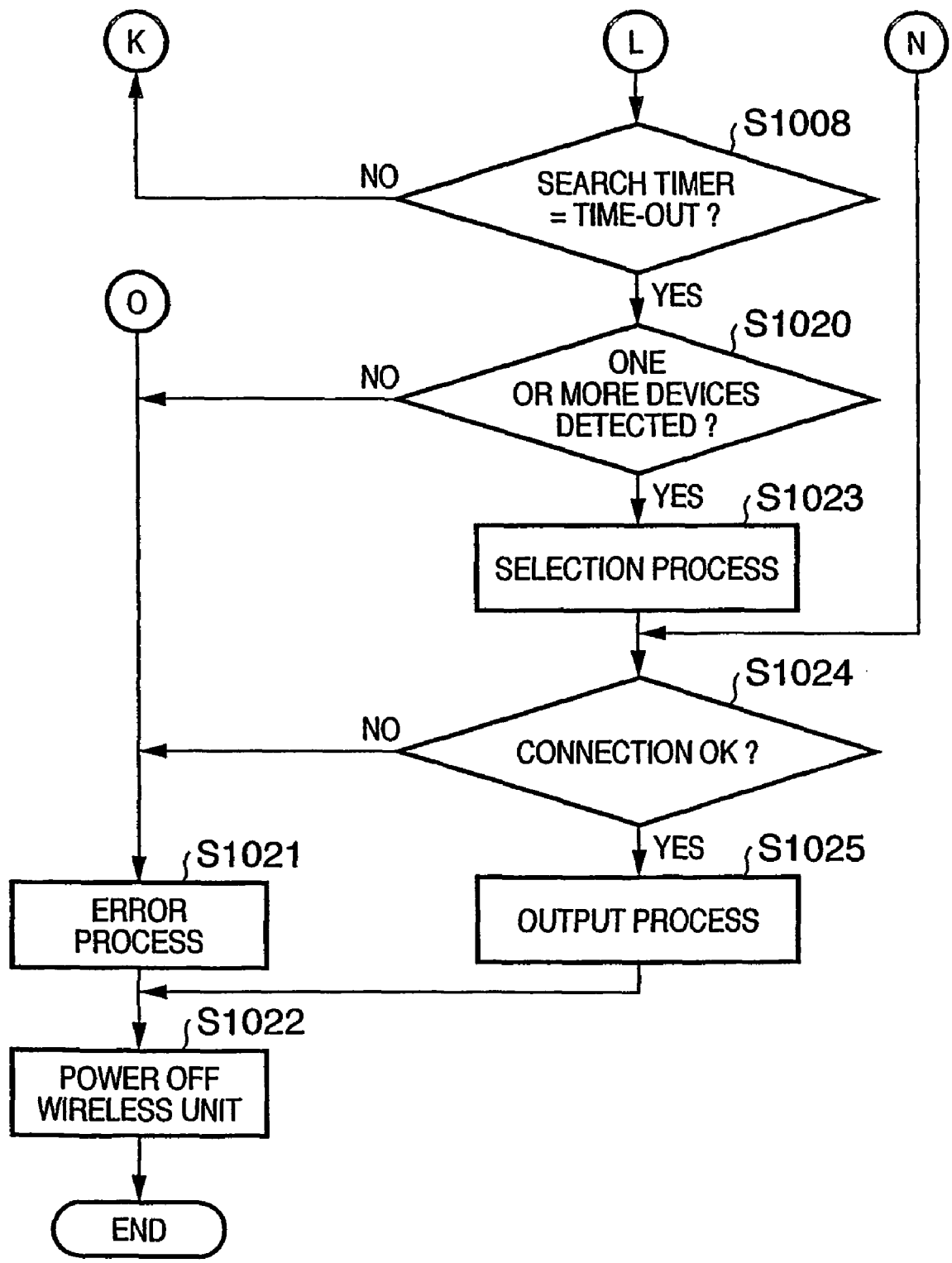
Figure 10C:
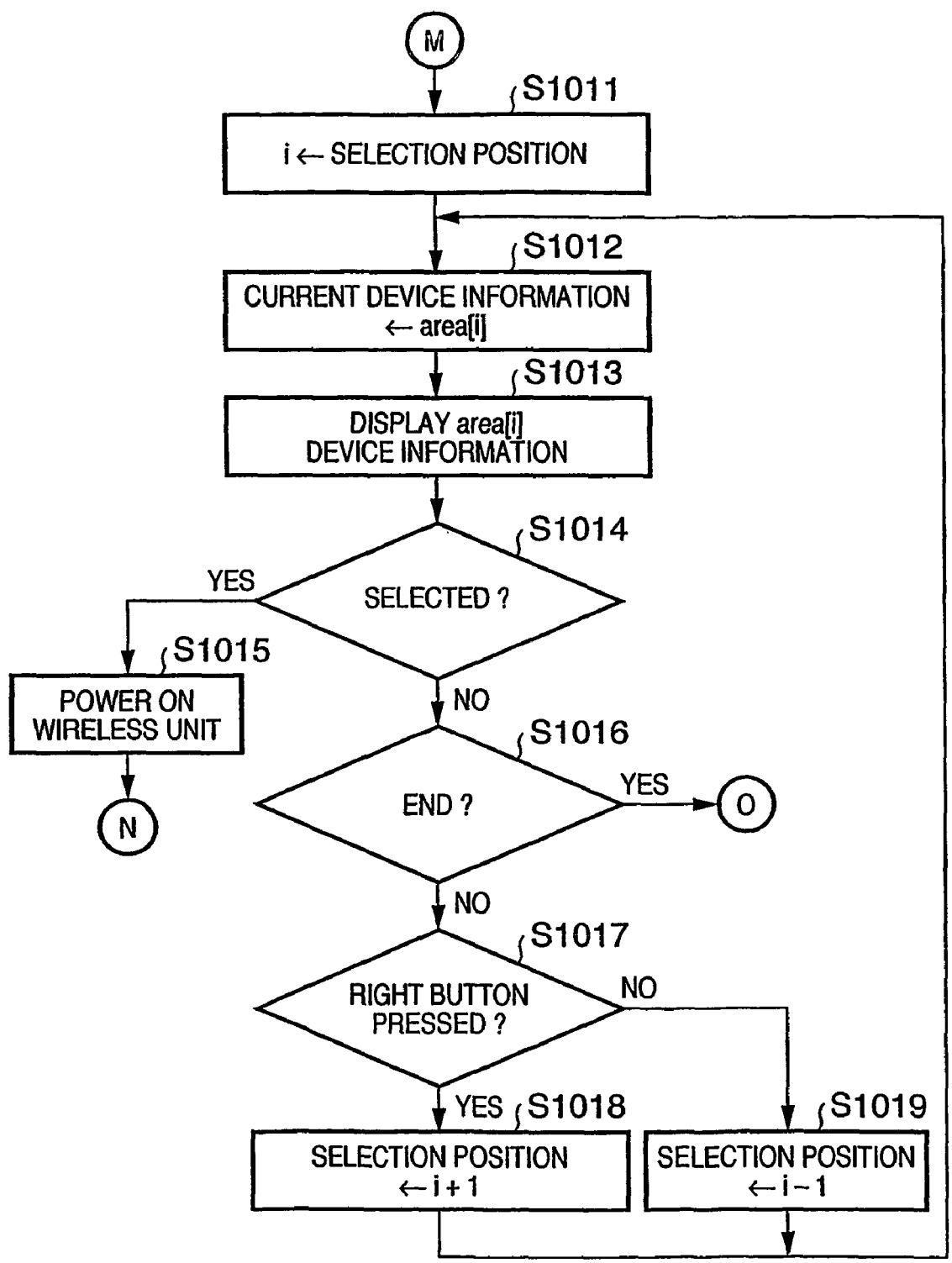

When the new search mode is selected in FIGS. 10A to 10C, the same processes as in the first embodiment may be executed.

Figure 6A:
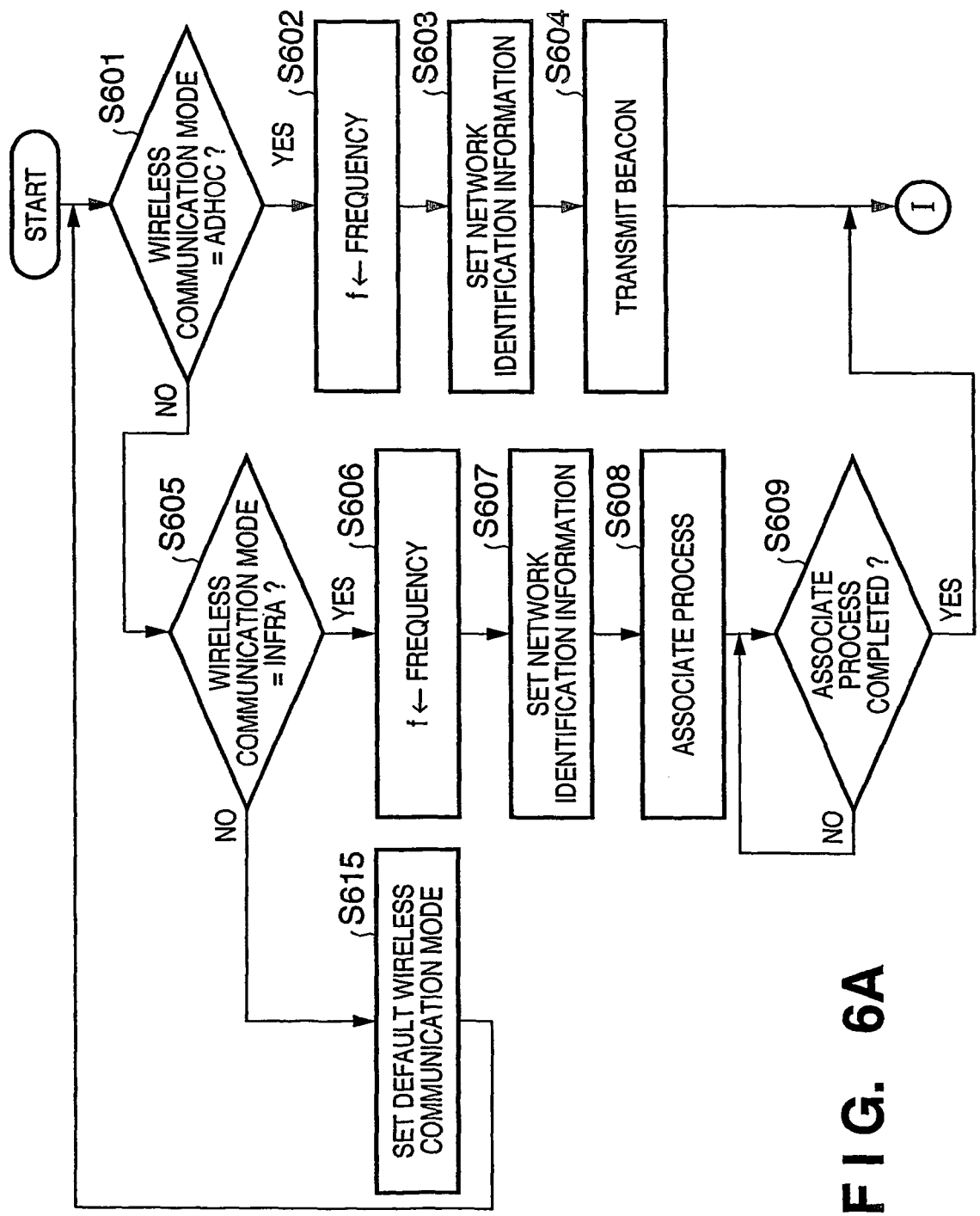
FIGS. 6A and 6B are flow charts showing the processing sequence of the printer according to the first embodiment of the present invention.
Figure 6B:
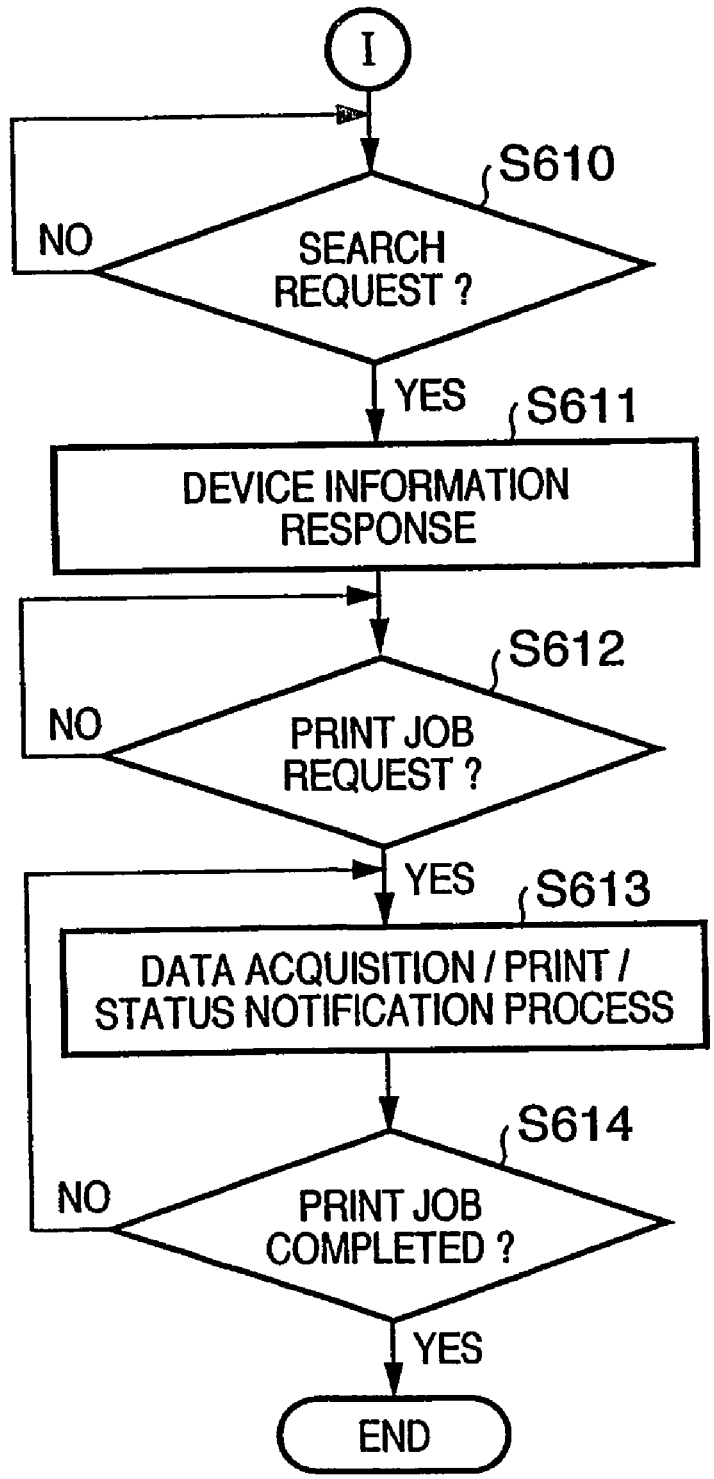

Also, since the processes shown in FIGS. 6A and 6B need only be executed as those on the printer or storage side, a description thereof will be omitted.

Third Embodiment

The third embodiment will be described below. The third embodiment will explain a case wherein identical network identification information (SSID) is set in both the two wireless communication devices, i.e., the digital camera 200 and printer 300.

Figure 12:
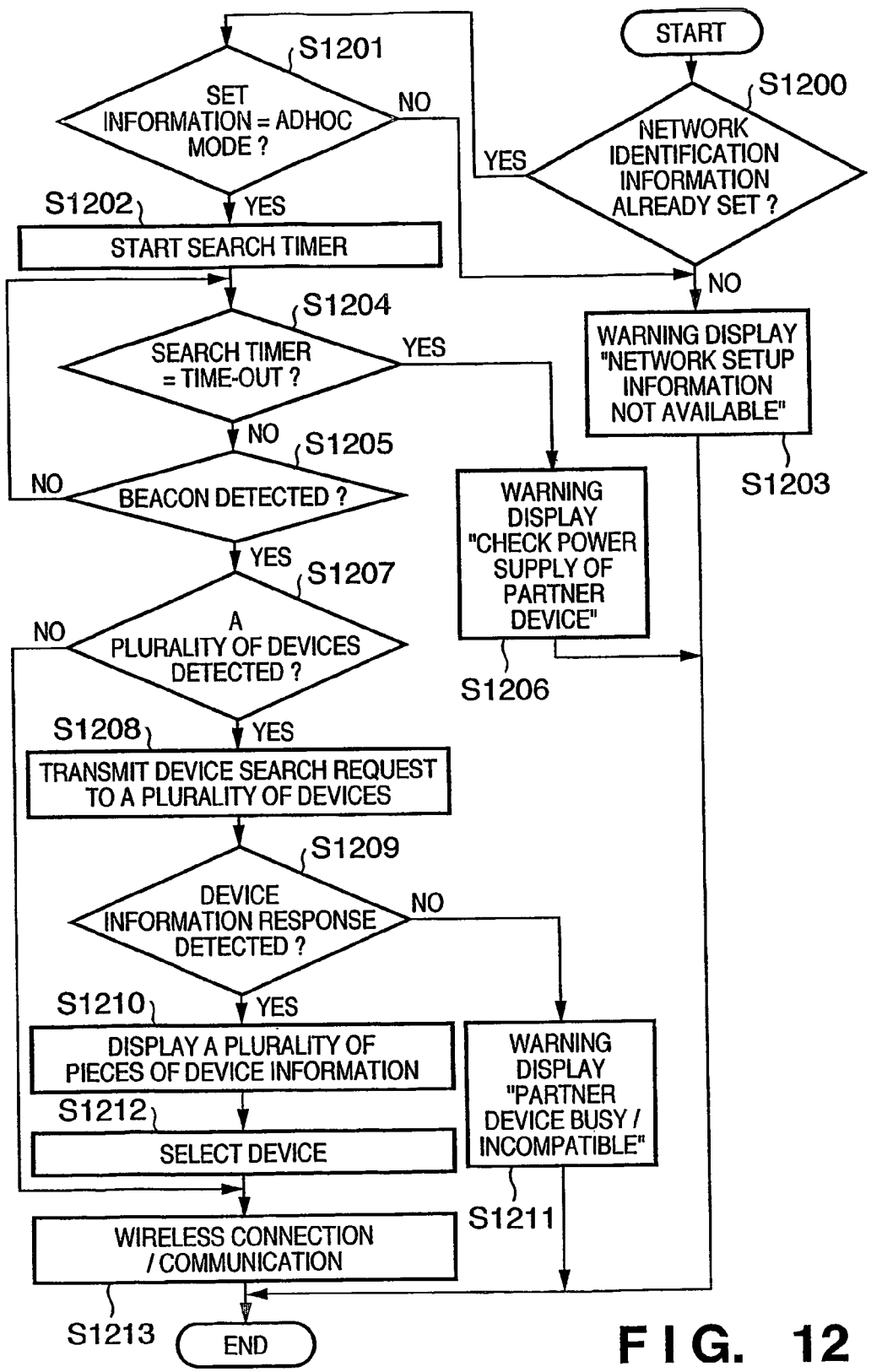
FIG. 12 is a flow chart showing the processing sequence of the digital camera according to the third embodiment of the present invention.

The operation of the digital camera 200 in this embodiment will be described first with reference to the flow chart of FIG. 12.

Upon detection of an operation of a predetermined button that instructs to start a wireless communication process, it is checked if network identification information has already been set and registered in the flash ROM (step S1200). If no network identification information is set, a warning message "network setup information is not available" or the like is displayed (step S1203), thus ending this process.

If it is determined that network identification information has already been set and registered, it is checked if the communication mode of the set information is an adhoc mode (step S1201). If the communication mode of the set data is an adhoc mode, a search timer is started, and a Beacon whose network identification information matches is detected (step S1205) until the search timer reaches a time-out (step S1204). If the timer has reached a time-out and no such Beacon is detected, it is determined that the wireless unit of a communication partner is OFF, and an error message "check the power supply of the partner device" or the like is displayed (step S1206). If a plurality of devices that transmit an identical Beacon is found upon detecting the Beacon (step S1207), a device search request is transmitted to these devices (step S1208). If a device information response is detected (step S1209), device information in that response is displayed (step S1210). The user selects a device to which he or she wants to establish connection from the displayed device information list (step S1212), thus establishing wireless connection and a communication channel (step S1213). On the other hand, if no device information response is detected, a warning message "partner device is BUSY/incompatible function" is displayed (step S1211). Furthermore, if only one device is found (step S1207), wireless connection and a communication channel are established (step S1213).

Figure 13:
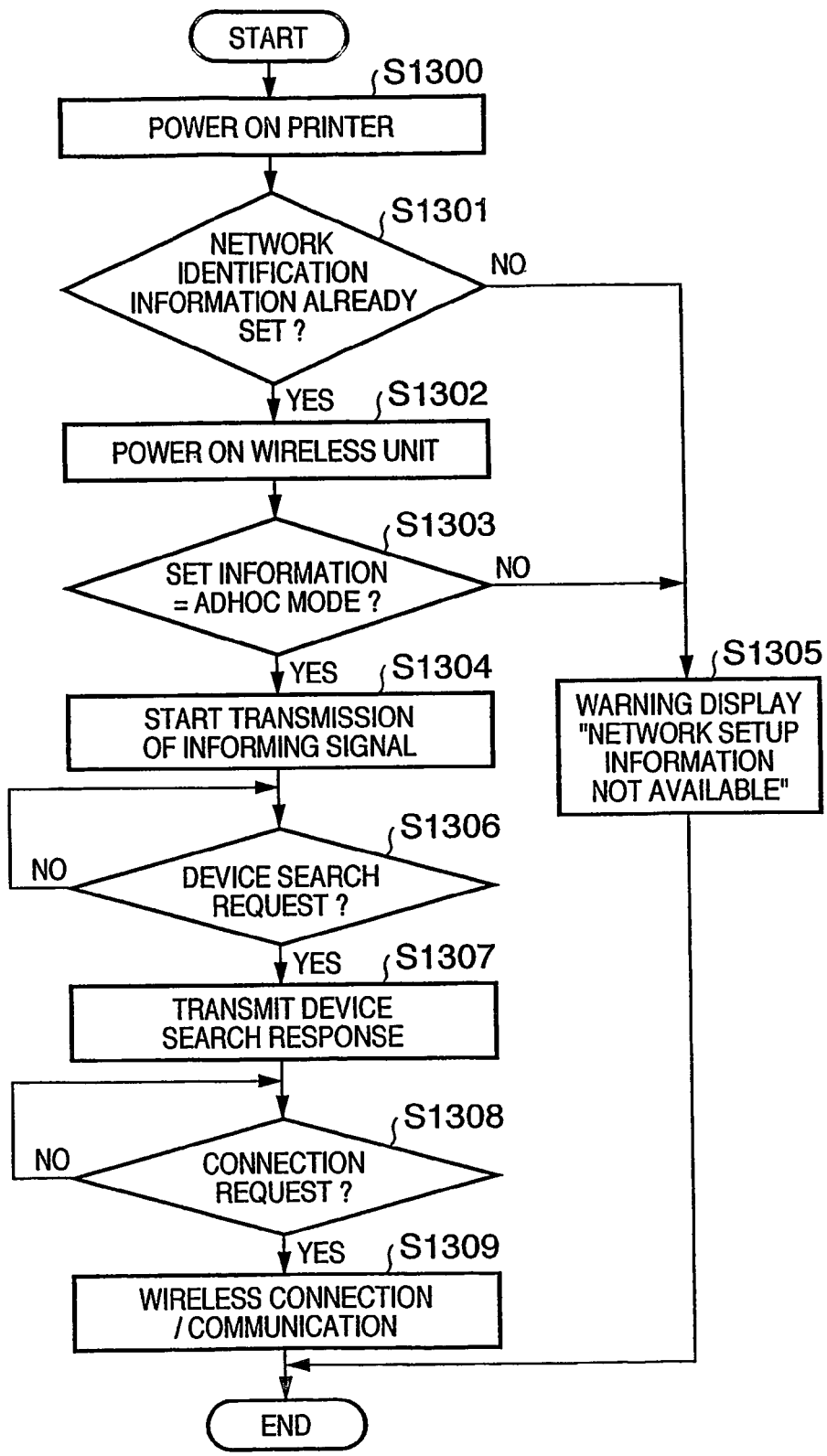
FIG. 13 is a flow chart showing the processing sequence of the printer according to the third embodiment of the present invention.

The operation of the printer 300 in the third embodiment will be described below with reference to the flow chart of FIG. 13.

When the power supply of the printer is turned on (step S1300), it is determined by checking the flash ROM 313 if network identification information has already been set (step S1301). If no network identification information is set, an error message "network setup information is not available" or the like is displayed (step S1305), thus ending this process.

If the set information is available, the power supply of the wireless communication unit 304 is turned on (step S1302), and it is confirmed if the communication mode of the set information is an adhoc mode (step S1303). If the communication mode is an adhoc mode, transmission of a Beacon (informing signal) is started (step S1304), and the control waits for reception of a device search request (step S1306). Upon reception of the device search request, a device search response is transmitted (step S1307). The control then waits for a connection request (step S1308), and a wireless communication channel is established and a data communication is made in accordance with the received connection request (step S1039). A print process is executed in this step S1309.

Note that the processes of the printer have been exemplified, and the same applies to the storage device.

As described above, according to the third embodiment, a common network connection setup is made in at least both the digital camera and printer, and network connection is established with a device which matches the commonly set network information, thus easily building a situation that allows digital camera —printer communications. Note that the user can change the operation mode and the like upon giving instruction information.

Also, this embodiment is effective when the above information is set as default values at the factory upon manufacturing the products of the digital camera 200 and printer 300, so as to obviate the need for user's troublesome network setup operations and to eliminate setup errors in practice.

When a digital camera—printer wireless communication start instruction is input as in the above example, both the devices are preferably set in the adhoc mode. This is because the printer described in this embodiment is ready to receive print data from, e.g., a host computer in a normal state, and the infrastructure mode is normally set as the wireless communication mode. That is, since the printer is normally set in the infrastructure mode, a one-to-one communication situation is more likely to be obtained by setting the adhoc mode, thus quickly establishing a communication between these devices.

Fourth Embodiment

The fourth embodiment of the present invention will be described below. The fourth embodiment will exemplify a case wherein the time required for the device search process is shortened and a connection target range is narrowed down by setting the type of device to communicate with in network identification information.

Figure 14:
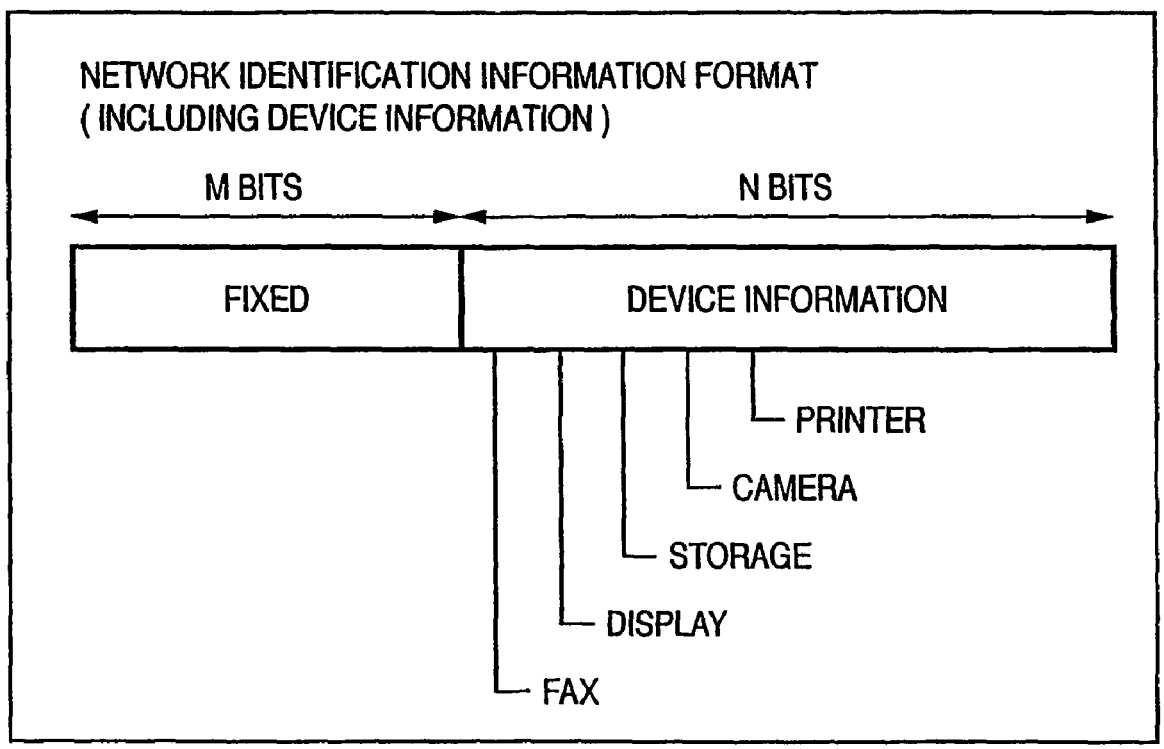
FIG. 14 shows the data format of network identification information according to the fourth embodiment of the present invention.
Figure 15:
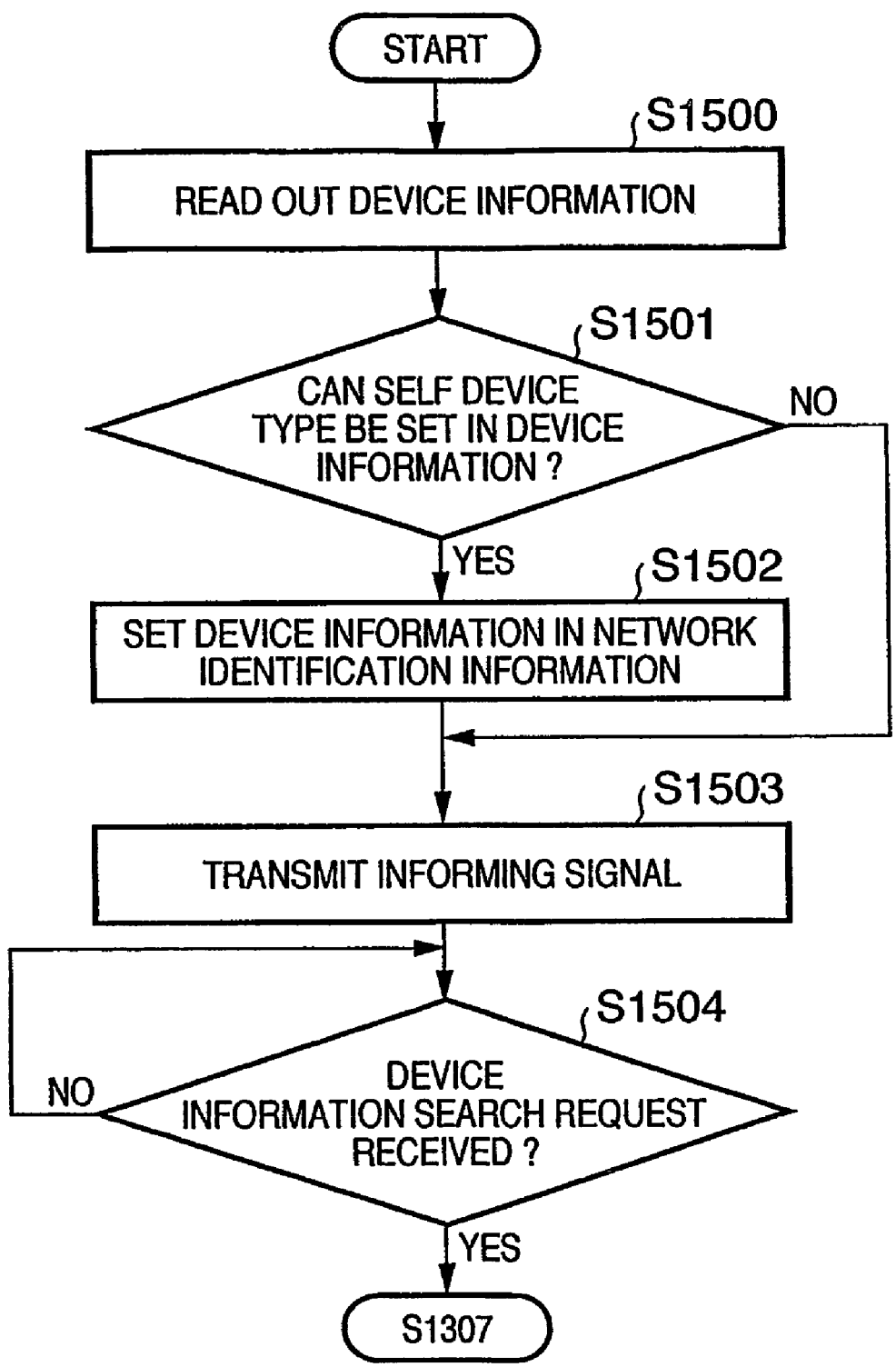
FIG. 15 is a flow chart showing the processing sequence of the printer according to the fourth embodiment of the present invention.
Figure 16:
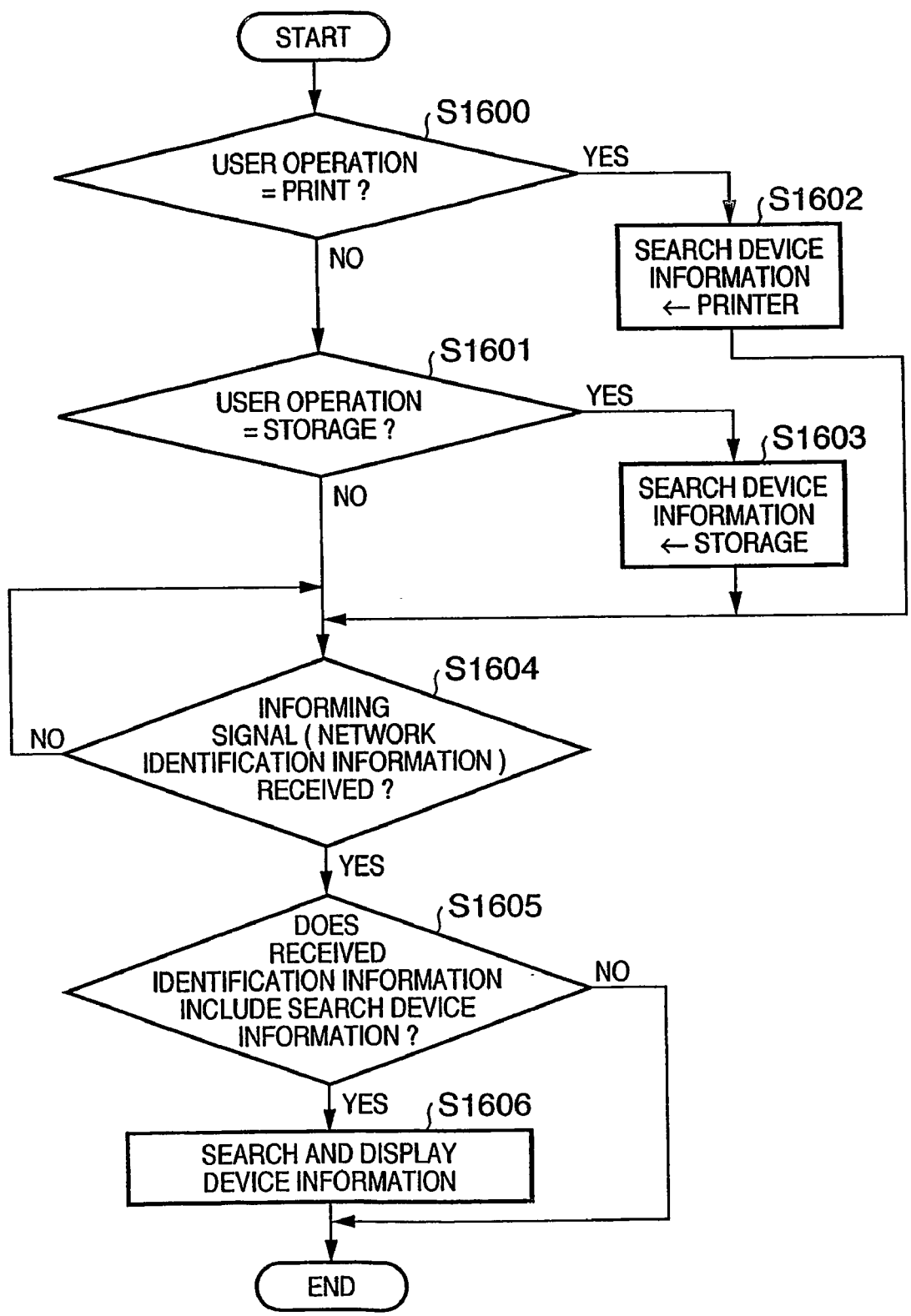
FIG. 16 is a flow chart showing the processing sequence of the digital camera according to the fourth embodiment of the present invention.

FIG. 14 shows network identification information of this embodiment, FIG. 15 shows the processing sequence of the printer 300 of the fourth embodiment, and FIG. 16 shows the processing sequence of the digital camera 200 of the fourth embodiment.

The network identification information shown in FIG. 14 will be described first. The network identification information consists of an M-bit predetermined value field (FIXED) and an N-bit field that can be used freely. In this embodiment, DeviceInformation (device class information) is assigned to respective bits of that freely usable N-bit field. FIG. 14 shows a case wherein the N-bit field contains bit information indicating a FAX/display/storage/camera/printer.

The operation of the printer 300 will be described below with reference to FIG. 15.

The printer 300 reads out device information (step S1500). Since the self device is a printer, "1" is set in a bit indicating a printer in DeviceInformation shown in FIG. 14 (steps S1501 and S1502). Then, a Beacon that contains this DeviceInformation and a network identifier is transmitted (step S1503), and the control waits for reception of a device information search request (step S1504). Upon reception of the search request, the flow advances to step S1307 in FIG. 13.

The operation of the digital camera 200 will be described below with reference to FIG. 16.

It is checked if an output destination required to execute a process that the user designates via the user interface of the digital camera is a printer or storage (steps S1600 and S1601). According to this instruction, a printer bit or storage bit is set as search device information (step S1602 or S1603).

An informing signal is received for a predetermined period of time, and device information (DeviceInformation field) of network identification information in that signal is checked. In this case, it is checked if the bit information previously set as the search device information matches this device information (step S1605). If matched devices are found, a list of such devices is selectably displayed (step S1606). After that, the user selects one device from the list, and wireless connection is established in practice.

In this way, since the type of partner device (printer/camera/storage/display/FAX) can be identified at the time of reception of network identification information before establishing wireless connection, a device search process can be conducted for only devices having a function selected by the user from a function menu (print/save/display, etc.). Hence, time required until a desired device is found can be shortened.

Other Embodiments

In the above embodiments, the wireless LAN (e.g., IEEE802.11a/b/g/h, etc.) has been exemplified as a wireless communication. Also, the present invention can be similarly applied to other wireless communication protocols (Bluetooth, UWB (Ultra Wide Band), and the like), and the wireless unit is not particularly limited.

In the above embodiments, the digital camera outputs an image to the printer, which prints that image, and the digital camera outputs an image to the storage, which stores that image. Also, the aforementioned technique can be applied when an image stored in a given digital camera is to be stored in another digital camera, when an image stored in the storage is output to the printer to print it out, and so forth. In this case, the processes explained in the above embodiments can be executed as those of the transmitting and receiving devices.

As described above, according to the embodiments of the present invention, even a novice user can establish a communication between wireless communication devices and can enjoy a desired service by setting information required for a wireless communication irrespective of a user's instruction without any user's troublesome setup operations upon connecting the wireless communication devices via a wireless communication.

As described above, according to the embodiments of the present invention, a wireless communication between wireless communication devices can be established, and a desired service can be provided without any troublesome setup operations.

As many apparently widely different embodiments of the present invention can be made without departing from the spirit and scope thereof, it is to be understood that the invention is not limited to the specific embodiments thereof except as defined in the claims.

The invention claimed is:

1. A wireless communication device comprising:
   a network detection unit adapted to detect a plurality of wireless networks;
   a network connection unit adapted to connect to one or more of the wireless networks detected by the network detection unit;
   a printer searching unit adapted to search for one or more printers having a predetermined print function within each wireless network connected to by the network connection unit;
   a network changing unit adapted to, when the printer searching unit completes searching for the one or more printers having the predetermined print function within a wireless network connected to by the network connection unit, change the wireless network connected to by the network connection unit to another wireless network detected by the network detection unit, to search for the one or more printers having the predetermined print function within the other wireless network connected to by the network connection unit;
   a display unit adapted to selectably display printer information associated with one or more printers detected by the printer search unit, every time the printer search unit detects one of the one or more printers having the predetermined print function;
   an aborting unit adapted to abort the searching by the printer searching unit, when an operator selects a printer associated with information displayed by the display unit; and
   a printer connection unit adapted to, when the operator selects the printer associated with the information displayed by the display unit, connect to one of the plurality of wireless networks including the selected printer and connect to the selected printer.

2. The device according to claim 1, further comprising:
   a storage unit that stores, in a memory, identification information of the one or more printers detected by the printer searching unit,
   wherein the display unit selectably displays the identification information stored in the memory.

3. The device according to claim 1, wherein the wireless communication device is an image sensing device or a storage device for executing a storage process of a sensed image.

4. The device according to claim 1, wherein, when the one or more printers having the predetermined print function are not detected, no signal is received in response to a search signal within a predetermined period of time, and an error display is made.

5. The device according to claim 1, further comprising:
   a determination unit adapted to determine if a detected beacon signal is in an ad hoc communication mode or in an infrastructure communication mode, and,
   when the determination unit determines that the detected beacon signal is in the ad hoc communication mode, the printer searching unit transmits a search signal for searching for the printer having the predetermined print function toward a printer that sent the detected beacon signal, and,
   when the determination unit determines that the detected beacon signal is in the infrastructure mode, the network connecting unit connects to an access point that sent the detected beacon signal and the printer searching unit transmits the search signal toward the access point.

6. The device according to claim 1, further comprising a registration unit adapted to register, in a memory, information associated with the printer connected to by the printer connection unit in accordance with an indication by the operator.

7. The device according to claim 6, further including a mode for executing a process for establishing a wireless communication based on the information registered by said registration unit.

8. A method performed by a wireless communication device, the method comprising:
   detecting a plurality of wireless networks;
   connecting to one or more of the wireless networks detected by the network detection unit;
   searching for one or more printers having a predetermined print function within each wireless network connected to;
   when the searching for the one or more printers having the predetermined print function within a wireless network completes, connecting to another wireless network detected by the detecting, to search for the one or more printers having the predetermined print function within the other wireless network connected to by the network connection unit;
   displaying printer information associated with the one or more printers detected by the searching, every time one of the one or more printers having the predetermined print function is detected by the searching;
   when an operator selects a printer associated with information displayed by the displaying, aborting the searching; and
   when the printer associated with the information displayed by the displaying is selected, connecting to one of the plurality of wireless networks including the selected printer and connecting to the selected printer.

* * * * *